United States Patent
Shao et al.

(10) Patent No.: US 11,050,524 B2
(45) Date of Patent: Jun. 29, 2021

(54) DATA SENDING METHOD, TERMINAL DEVICE, AND NETWORK DEVICE

(71) Applicant: HUAWEI TECHNOLOGIES CO., LTD., Guangdong (CN)

(72) Inventors: Jiafeng Shao, Beijing (CN); Lei Guan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 103 days.

(21) Appl. No.: 16/577,985

(22) Filed: Sep. 20, 2019

(65) Prior Publication Data

US 2020/0014493 A1 Jan. 9, 2020

Related U.S. Application Data

(63) Continuation of application No. PCT/CN2018/079821, filed on Mar. 21, 2018.

(30) Foreign Application Priority Data

Mar. 22, 2017 (CN) .......................... 201710175091.6

(51) Int. Cl.
*H04L 1/18* (2006.01)
*H04L 1/00* (2006.01)
(Continued)

(52) U.S. Cl.
CPC ............ *H04L 1/189* (2013.01); *H04L 1/0003* (2013.01); *H04L 5/0082* (2013.01); *H04W 72/1263* (2013.01); *H04W 80/08* (2013.01)

(58) Field of Classification Search
CPC ..... H04L 1/189; H04L 1/0003; H04L 5/0082; H04L 1/1607; H04W 72/1263;
(Continued)

(56) References Cited

U.S. PATENT DOCUMENTS

2010/0008440 A1* 1/2010 Lin .................. H04L 5/0058
375/267
2010/0061438 A1* 3/2010 Tan .................. H04L 1/0016
375/227
(Continued)

FOREIGN PATENT DOCUMENTS

CN 101420292 A 4/2009
CN 101646224 A 2/2010
(Continued)

*Primary Examiner* — Afshawn M Towfighi
(74) *Attorney, Agent, or Firm* — Womble Bond Dickinson (US) LLP

(57) ABSTRACT

A data sending method, a terminal device, and a network device are described. The method may include receiving, by a terminal device, first scheduling information. The first scheduling information indicates first resources that are resources used to send first transport blocks. Furthermore, the first scheduling information indicates a probability value, and the probability value is a block error rate for the first transport blocks that are received by the network device on the first resources or a probability that the network device successfully receives the first transport blocks on the first resources. The method may also include sending, by the terminal device, the first transport blocks on the first resources based on the first scheduling information. In the embodiments, the terminal device may determine, based on the probability value, whether a preparation operation is to be performed for retransmitting all or some of the first transport blocks, so that a time period for the retransmitting can be shortened, thereby reducing a transmission delay.

20 Claims, 6 Drawing Sheets

(51) Int. Cl.
*H04L 5/00* (2006.01)
*H04W 72/12* (2009.01)
*H04W 80/08* (2009.01)

(58) Field of Classification Search
CPC ............. H04W 80/08; H04W 72/1284; H04W 72/042; H04W 72/1268; H04W 72/1289
See application file for complete search history.

(56) References Cited

U.S. PATENT DOCUMENTS

| | | | |
|---|---|---|---|
| 2012/0076103 A1 | 3/2012 | Dai et al. | |
| 2016/0261391 A1 | 9/2016 | Chen et al. | |
| 2017/0310511 A1* | 10/2017 | Byun | .................. H04B 7/0452 |
| 2018/0049234 A1 | 2/2018 | Lee et al. | |

FOREIGN PATENT DOCUMENTS

| | | |
|---|---|---|
| CN | 101754274 A | 6/2010 |
| CN | 101902817 A | 12/2010 |
| CN | 105978671 A | 9/2016 |
| CN | 106341897 A | 1/2017 |
| WO | 2013184053 A1 | 12/2013 |
| WO | 2016040290 A1 | 3/2016 |
| WO | 2016148358 A1 | 9/2016 |
| WO | 2016195754 A1 | 12/2016 |

\* cited by examiner

DATA SENDING METHOD, TERMINAL DEVICE, AND NETWORK DEVICE

CROSS-REFERENCE TO RELATED APPLICATIONS

This application is a continuation of International Application No. PCT/CN2018/079821, filed on Mar. 21, 2018, which claims priority to Chinese Patent Application No. 201710175091.6, filed on Mar. 22, 2017. The disclosures of the aforementioned applications are hereby incorporated by reference in their entireties.

TECHNICAL FIELD

This application relates to the communications field, and more specifically, to a data sending method, a terminal device, and a network device.

BACKGROUND

In a long term evolution-advanced (LTE-A) system, a terminal device receives first scheduling information that is used to instruct to transmit a first transport block and that is sent by a network device, and transmits the first transport block based on the first scheduling information. If the transmission of the first transport block sent by the terminal device to the network device fails, the terminal device may retransmit the first transport block. Specifically, the network device may send second scheduling information used to instruct to retransmit the first transport block, where the second scheduling information carries indication information used to instruct the terminal device to retransmit the first transport block; and the terminal device retransmits the first transport block based on the second scheduling information. In this way, a time period from receiving the first scheduling information by user equipment (UE) to transmitting the first transport block by the UE based on the first scheduling information is the same as a time period from receiving the second scheduling information by the UE to retransmitting the first transport block by the UE based on the second scheduling information.

In a new radio (NR) system and the LTE-A system, an ultra-reliable and low-latency communications (URLLC) service is considered. Therefore, if the first transport block is used to transmit a URLLC service that requires a relatively low transmission delay, when the first transport block needs to be retransmitted, it is difficult to meet the requirement of the relatively low transmission delay by using an existing technical solution.

SUMMARY

This application provides a data sending method, a terminal device, and a network device, to reduce a data transmission delay.

According to a first aspect, a data sending method is provided, where the method includes: receiving, by a terminal device, first scheduling information, where the first scheduling information is used to indicate first resources, the first resources are resources used to send first transport blocks, and the first scheduling information is further used to indicate that some or all of the first transport blocks may be retransmitted, or that some or all of the first transport blocks may not be transmitted; and sending, by the terminal device, the first transport blocks on the first resources based on the first scheduling information.

The terminal device receives the first scheduling information that is used to indicate first resources used to send the first transport blocks, and to indicate that some or all of the first transport blocks may or may not be retransmitted, and sends the first transport blocks on the first resources based on the first scheduling information. If the terminal device determines, based on the first scheduling information, that some or all of the first transport blocks may be retransmitted, before the terminal device receives second scheduling information or third scheduling information used to instruct the terminal device to retransmit some or all of the first transport blocks, the terminal device may determine whether a preparation operation needs to be performed for retransmitting some or all of the first transport blocks, so that a time period for retransmitting some or all of the first transport blocks can be shortened.

In some possible embodiments, the method further includes: determining, by the terminal device based on the first scheduling information, that some or all of the first transport blocks may be retransmitted, or that some or all of the first transport blocks may not be retransmitted.

The first scheduling information is used to indicate that some or all of the first transport blocks may be retransmitted, or to indicate that some or all of the first transport blocks may not be retransmitted. If the terminal device determines, based on the first scheduling information, that some or all of the first transport blocks may be retransmitted, before the terminal device receives second scheduling information or third scheduling information used to instruct the terminal device to retransmit some or all of the first transport blocks, the terminal device may determine whether a preparation operation needs to be performed for retransmitting some or all of the first transport blocks, so that a time period for retransmitting some or all of the first transport blocks can be shortened.

In some possible embodiments, the method further includes: performing, by the terminal device, a preparation operation for retransmitting some or all of the first transport blocks, where the terminal device determines that some or all of the first transport blocks may be retransmitted.

If the terminal device determines, based on the first scheduling information, that some or all of the first transport blocks may be retransmitted, the terminal device performs the preparation operation. In this way, the terminal device may retransmit some or all of the first transport blocks within a relatively short time period, thereby reducing a delay for retransmitting some or all of the first transport blocks.

The preparation operation includes at least one of the following: coding processing, configuring higher layer configuration information, and receiving the higher layer configuration information. For the coding processing, the terminal device may encode at least one code block at a preset code rate by using a coding scheme of a Turbo parallel concatenated convolutional code (PCCC), a low-density parity-check code (LDPC), a convolutional code (CC), a tail biting convolutional code (TBCC), or a polar code; or may encode at least one code block at a preset code rate by using a coding scheme of Turbo, a PCCC, an LDPC, a CC, or a TBCC, and then perform one or a combination of the following processing: scrambling, modulation, layer mapping, and precoding.

In some possible embodiments, the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a retransmission transmit power control command used to retransmit some or all of the first transport blocks.

The first scheduling information is used to indicate the coding scheme and the like used to retransmit some or all of the first transport blocks, so that information carried in the scheduling information used to instruct to retransmit some or all of the first transport blocks can be reduced, thereby reducing control signaling overheads on a network, and increasing network transmission efficiency.

Specifically, the modulation scheme used to retransmit some or all of the first transport blocks may be QPSK, 16 QAM, 64 QAM, 256 QAM, 512 QAM, or 1024 QAM. This is not limited in the present invention.

Specifically, the time-frequency domain resource used to retransmit some or all of the first transport blocks may be one or more time domain resources and/or one or more frequency domain resources. This is not limited in the present invention.

Specifically, the coding scheme used to retransmit some or all of the first transport blocks may be Turbo, a PCCC, an LDPC, a CC, a TBCC, or polar. This is not limited in the present invention.

Specifically, the reference signal information used to retransmit some or all of the first transport blocks may be sending location information of a reference signal, a sequence of the reference signal, and/or a comb structure of the reference signal. This is not limited in the present invention.

Specifically, the redundancy version used to retransmit some or all of the first transport blocks may be 0, 1, 2, or 3. This is not limited in the present invention.

Specifically, the code rate used to retransmit some or all of the first transport blocks may be any positive number greater than 0. This is not limited in the present invention.

Specifically, the antenna port used to retransmit some or all of the first transport blocks may be any antenna port number. This is not limited in the present invention.

Specifically, the precoding matrix indication information used to retransmit some or all of the first transport blocks may be precoding indications of one or more beams. This is not limited in the present invention.

Specifically, the carrier indication information used to retransmit some or all of the first transport blocks may be a carrier index number or a carrier group index number. This is not limited in the present invention.

Specifically, the time interval used to retransmit some or all of the first transport blocks may have a definition same as a definition of a time interval in step 301 and step 302. Details are not described herein again.

Specifically, the start information used to retransmit some or all of the first transport blocks may be that a retransmission preparation is started before scheduling information indicating retransmission is received, or that a retransmission preparation is not started before scheduling information indicating retransmission is received. This is not limited in the present invention.

Specifically, the retransmission transmit power control command used to retransmit some or all of the first transport blocks may be a transmit power control command indicating a carrier, or may be a transmit power control command indicating a carrier group. This is not limited in the present invention.

It should be understood that the first scheduling information may be further used to indicate one piece of one type of information, a plurality of types of information, or a plurality of pieces of same information.

In some possible embodiments, the method further includes: receiving, by the terminal device, second scheduling information, where the second scheduling information is used to instruct the terminal device to retransmit some or all of the first transport blocks on second resources; and retransmitting, by the terminal device, some or all of the first transport blocks on the second resources based on the second scheduling information.

When the terminal device already learns that some or all of the first transport blocks may be retransmitted, the terminal device may perform the preparation operation before receiving the second scheduling information. A time period for retransmitting some or all of the first transport blocks is reduced when compared with that in a conventional solution.

In some possible embodiments, the method further includes: receiving, by the terminal device, third scheduling information, where the third scheduling information is used to instruct the terminal device to retransmit some or all of the first transport blocks; determining, by the terminal device, third resources based on the third scheduling information and/or the first scheduling information; and retransmitting, by the terminal device, some or all of the first transport blocks on the third resources.

The first scheduling information is used to indicate the modulation scheme and the like used to retransmit some or all of the first transport blocks, and the third scheduling information includes indication information other than the first scheduling information. The terminal device determines the third resources based on the third scheduling information and/or the first scheduling information, and determines, on the third resources, to retransmit some or all of the first transport blocks.

The first scheduling information can be used to reduce information carried in the scheduling information used to instruct to retransmit some or all of the first transport blocks, thereby reducing control signaling overheads on a network, and increasing network transmission efficiency.

In some possible embodiments, the method further includes: determining, by the terminal device based on at least one of higher layer signaling, the first scheduling information, the second scheduling information, and the third scheduling information, to retransmit some of the first transport blocks or all of the first transport blocks.

The terminal device may determine to retransmit some of the first transport blocks or all of the first transport blocks. Some of the first transport blocks may be at least one code block or at least one code block group. This is not limited in this application. If the terminal device determines to retransmit some of the first transport blocks, sizes of the to-be-retransmitted transport blocks are reduced when compared with those in a conventional solution, thereby increasing network resource utilization.

In some possible embodiments, the first scheduling information includes first indication information, the first indication information is used to indicate one of at least two modulation and coding scheme MCS tables, a first table of the at least two MCS tables is used to indicate that some or all of the first transport blocks may be retransmitted, and a second table of the at least two MCS tables is used to indicate that some or all of the first transport blocks may not be retransmitted.

The terminal device determines, based on the first indication information, whether the MCS table is the first table or the second table, so as to determine whether some or all of the first transport blocks may or may not be retransmitted. Whether some or all of the first transport blocks may or may not be retransmitted is "implicitly" indicated, without introducing an extra indication information field. In this way, information carried in the first scheduling information can be reduced, thereby reducing control signaling overheads on a network, and increasing network transmission efficiency.

In some possible embodiments, the first scheduling information includes second indication information, the second indication information is at least one bit, a first bit status value of the at least one bit is used to indicate that some or all of the first transport blocks may be retransmitted, and a second bit status value of the at least one bit is used to indicate that some or all of the first transport blocks may not be retransmitted.

The first bit status value of the at least one bit is used to indicate that some or all of the first transport blocks may be retransmitted, and the second bit status value of the at least one bit is used to indicate that some or all of the first transport blocks may not be retransmitted. In other words, whether the first transport blocks may or may not be retransmitted is "explicitly" indicated, and a dedicated indication information field is introduced, so that a network device can flexibly indicate whether some or all of the first transport blocks may be retransmitted.

In some possible embodiments, the first scheduling information includes third indication information, the third indication information is used to indicate one of at least two time intervals, a first time interval of the at least two time intervals is used to indicate that some or all of the first transport blocks may be retransmitted, and a second time interval of the at least two time intervals is used to indicate that some or all of the first transport blocks may not be retransmitted.

In some possible embodiments, the method further includes: receiving, by the terminal device, higher layer signaling, where the higher layer signaling includes a first threshold; and determining, by the terminal device, the first time interval and/or the second time interval based on the first threshold.

The terminal device determines, based on the first threshold included in the higher layer signaling, whether the time interval indicated by the third indication information is the first time interval or the second time interval, to prevent the network device from separately sending a specific first time interval or second time interval, thereby reducing control signaling overheads on a network, and increasing network transmission efficiency.

The third indication information is used to indicate one of the at least two time intervals, the first time interval of the at least two time intervals is used to indicate that some or all of the first transport blocks may be retransmitted, and the second time interval of the at least two time intervals is used to indicate that some or all of the first transport blocks may not be retransmitted. Whether the first transport blocks may or may not be retransmitted is "implicitly" indicated, without introducing an extra indication information field. In this way, information carried in the first scheduling information can be reduced, thereby reducing control signaling overheads on a network, and increasing network transmission efficiency.

The at least two time intervals include at least one of the following time intervals:

a time interval from a time domain resource used to receive the first scheduling information to a first time domain resource included in the first resources, where for example, if the time domain resource for the first scheduling information is a time domain resource #A, and the first time domain resource included in the first resources is a time domain resource #B, the time interval is from the time domain resource #A to the time domain resource #B; assuming that each of time domain resource lengths of the time domain resource #A and the time domain resource #B is a first time length, the time interval is a time period having (B-A) first time lengths;

a time interval from a time domain resource used to receive the first scheduling information to a time domain resource that may be used to receive the second scheduling information, or a time interval from a time domain resource used to receive the first scheduling information to a time domain resource that may be used to receive the third scheduling information, where for example, if the time domain resource for the first scheduling information is a time domain resource #A, and the time domain resource that may be used to receive the second scheduling information is a time domain resource #C, the time interval is from the time domain resource #A to the time domain resource #C; assuming that each of time domain resource lengths of the time domain resource #A and the time domain resource #C is a first time length, the time interval is a time period having (C-A) first time lengths;

a time interval from a time domain resource used to receive the first scheduling information to a time domain resource that may be used to retransmit some or all of the first transport blocks, or a time interval from a time domain resource used to receive the first scheduling information to a time domain resource included in the second resources, or a time interval from a time domain resource used to receive the first scheduling information to a time domain resource included in the third resources, where for example, if the time domain resource for the first scheduling information is a time domain resource #A, and the time domain resource that may be used to retransmit some or all of the first transport blocks is a time domain resource #D, the time interval is from the time domain resource #A to the time domain resource #D; assuming that each of time domain resource lengths of the time domain resource #A and the time domain resource #D is a first time length, the time interval is a time period having (D-A) first time lengths;

a time interval from a first time domain resource included in the first resources to a time domain resource that may be used to retransmit some or all of the first transport blocks, or a time interval from a first time domain resource included in the first resources to a second time resource included in the second resources, where for example, if the first time domain resource included in the first resources is a time domain resource #B, and the time domain resource that may be used to retransmit some or all of the first transport blocks is a time domain resource #D, the time interval is from the time domain resource #B to the time domain resource #D; assuming that each of time domain resource lengths of the time domain resource #B and the time domain resource #D is a first time length, the time interval is a time period having (D-B) first time lengths;

a time interval from a first time domain resource included in the first resources to a time domain resource that may be used to receive the second scheduling information, or a time interval from a first time domain resource included in the first resources to a time domain resource that may be used to receive the third scheduling information, where for example, if the first time domain resource included in the first resources is a time domain resource #B, and the time domain resource that may be used to receive the second scheduling information is a time domain resource #C, the time interval is from the time domain resource #B to the time domain resource #C; assuming that each of time domain resource lengths of the time domain resource #B and the time domain resource #C is a first time length, the time interval is a time period having (C-B) first time lengths; and a time interval from a time domain resource used to receive the second scheduling information to a time domain resource that may be used to retransmit some or all of the first transport blocks, or a time interval from a time domain resource used to receive the second scheduling information to a time domain resource included in the second resources, or a time interval from a time domain resource used to receive the third scheduling information to a time domain resource that may be used to retransmit some or all of the first transport blocks, or a time interval from a time domain resource used to receive the third scheduling information to a time domain resource included in the third resources, where for example, if the time domain resource used to receive the second scheduling information is a time domain resource #C, and the time domain resource that may be used to retransmit some or all of the first transport blocks is a time domain resource #D, the time interval is from the time domain resource #C to the time domain resource #D; assuming that each of time domain resource lengths of the time domain resource #C and the time domain resource #D is a first time length, the time interval is a time period having (D-C) first time lengths.

The time domain resource that may be used to receive the second scheduling information, the time domain resource that may be used to receive the third scheduling information, and the time domain resource that may be used to retransmit some or all of the first transport blocks may be a time domain resource configured by using the higher layer signaling or may be predefined.

In some possible embodiments, the first scheduling information includes fourth indication information, the fourth indication information is used to indicate one of at least two modulation and coding scheme MCS values, a first MCS value of the at least two MCS values is used to indicate that some or all of the first transport blocks may be retransmitted, and a second MCS value of the at least two MCS values is used to indicate that some or all of the first transport blocks may not be retransmitted.

The terminal device determines, based on the fourth indication information, whether the MCS value is the first MCS value or the second MCS value, so as to determine whether some or all of the first transport blocks may or may not be retransmitted. Whether some or all of the first transport blocks may or may not be retransmitted is "implicitly" indicated, without introducing an extra indication information field. In this way, information carried in the first scheduling information can be reduced, thereby reducing control signaling overheads on a network, and increasing network transmission efficiency.

According to a second aspect, a data receiving method is provided, where the method includes: sending, by a network device, first scheduling information, where the first scheduling information is used to indicate first resources, the first resources are resources used to send first transport blocks, and the first scheduling information is further used to indicate that some or all of the first transport blocks may be retransmitted, or that some or all of the first transport blocks may not be transmitted; and receiving, by the network device, the first transport blocks on the first resources.

The first scheduling information used to indicate the first resources used to send the first transport blocks and to indicate that some or all of the first transport blocks may or may not be retransmitted is sent, and the first transport blocks are sent on the first resources based on the first scheduling information. In this way, a terminal device may determine, in advance based on whether some or all of the first transport blocks may or may not be retransmitted, whether a preparation operation needs to be performed for retransmitting the first transport blocks, and then perform the preparation operation in advance when determining that the first transport blocks may be retransmitted. Therefore, a time period for retransmitting some or all of the first transport blocks is reduced.

In some possible embodiments, the first scheduling information includes first indication information, the first indication information is used to indicate one of at least two modulation and coding scheme MCS tables, a first table of the at least two MCS tables is used to indicate that some or all of the first transport blocks may be retransmitted, and a second table of the at least two MCS tables is used to indicate that some or all of the first transport blocks may not be retransmitted.

The network device sends the first scheduling information including the first indication information, so that the terminal device determines, based on the first indication information, whether the MCS table is the first table or the second table, and then can determine whether the first transport blocks may or may not be retransmitted. Whether the first transport blocks may or may not be retransmitted is "implicitly" indicated, without introducing an extra indication information field. In this way, information carried in the first scheduling information can be reduced, thereby reducing control signaling overheads on a network, and increasing network transmission efficiency.

In some possible embodiments, the first scheduling information includes second indication information, the second indication information is at least one bit, a first bit status value of the at least one bit is used to indicate that some or all of the first transport blocks may be retransmitted, and a second bit status value of the at least one bit is used to indicate that some or all of the first transport blocks may not be retransmitted.

The first bit status value of the at least one bit is used to indicate that some or all of the first transport blocks may be retransmitted, and the second bit status value of the at least one bit is used to indicate that some or all of the first transport blocks may not be retransmitted. In other words, whether the first transport blocks may or may not be retransmitted is "explicitly" indicated, and a dedicated indication information field is introduced. In this way, the network device can flexibly indicate whether some or all of the first transport blocks may be retransmitted.

In some possible embodiments, the first scheduling information includes third indication information, the third indication information is used to indicate one of at least two time intervals, a first time interval of the at least two time intervals is used to indicate that some or all of the first transport blocks may be retransmitted, and a second time interval of the at least two time intervals is used to indicate that some or all of the first transport blocks may not be retransmitted.

The third indication information is used to indicate one of the at least two time intervals, the first time interval of the at least two time intervals is used to indicate that some or all of the first transport blocks may be retransmitted, and the second time interval of the at least two time intervals is used to indicate that some or all of the first transport blocks may not be retransmitted. Whether the first transport blocks may or may not be retransmitted is "implicitly" indicated, without introducing an extra indication information field. In this way, information carried in the first scheduling information can be reduced, thereby reducing control signaling overheads on a network, and increasing network transmission efficiency.

The at least two time intervals include at least one of the following time intervals:

a time interval from a time domain resource used to receive the first scheduling information to a first time domain resource included in the first resources, where for example, if the time domain resource for the first scheduling information is a time domain resource #A, and the first time domain resource included in the first resources is a time domain resource #B, the time interval is from the time domain resource #A to the time domain resource #B; assuming that each of time domain resource lengths of the time domain resource #A and the time domain resource #B is a first time length, the time interval is a time period having (B-A) first time lengths;

a time interval from a time domain resource used to receive the first scheduling information to a time domain resource that may be used to receive second scheduling information, or a time interval from a time domain resource used to receive the first scheduling information to a time domain resource that may be used to receive third scheduling information, where for example, if the time domain resource for the first scheduling information is a time domain resource #A, and the time domain resource that may be used to receive the second scheduling information is a time domain resource #C, the time interval is from the time domain resource #A to the time domain resource #C; assuming that each of time domain resource lengths of the time domain resource #A and the time domain resource #C is a first time length, the time interval is a time period having (C-A) first time lengths;

a time interval from a time domain resource used to receive the first scheduling information to a time domain resource that may be used to retransmit some or all of the first transport blocks, or a time interval from a time domain resource used to receive the first scheduling information to a time domain resource included in second resources, or a time interval from a time domain resource used to receive the first scheduling information to a time domain resource included in third resources, where for example, if the time domain resource for the first scheduling information is a time domain resource #A, and the time domain resource that may be used to retransmit some or all of the first transport blocks is a time domain resource #D, the time interval is from the time domain resource #A to the time domain resource #D; assuming that each of time domain resource lengths of the time domain resource #A and the time domain resource #D is a first time length, the time interval is a time period having (D-A) first time lengths;

a time interval from a first time domain resource included in the first resources to a time domain resource that may be used to retransmit some or all of the first transport blocks, or a time interval from a first time domain resource included in the first resources to a second time resource included in second resources, where for example, if the first time domain resource included in the first resources is a time domain resource #B, and the time domain resource that may be used to retransmit some or all of the first transport blocks is a time domain resource #D, the time interval is from the time domain resource #B to the time domain resource #D; assuming that each of time domain resource lengths of the time domain resource #B and the time domain resource #D is a first time length, the time interval is a time period having (D-B) first time lengths;

a time interval from a first time domain resource included in the first resources to a time domain resource that may be used to receive second scheduling information, or a time interval from a first time domain resource included in the first resources to a time domain resource that may be used to receive third scheduling information, where for example, if the first time domain resource included in the first resources is a time domain resource #B, and the time domain resource that may be used to receive the second scheduling information is a time domain resource #C, the time interval is from the time domain resource #B to the time domain resource #C; assuming that each of time domain resource lengths of the time domain resource #B and the time domain resource #C is a first time length, the time interval is a time period having (C-B) first time lengths; and a time interval from a time domain resource used to receive second scheduling information to a time domain resource that may be used to retransmit some or all of the first transport blocks, or a time interval from a time domain resource used to receive second scheduling information to a time domain resource included in second resources, or a time interval from a time domain resource used to receive third scheduling information to a time domain resource that may be used to retransmit some or all of the first transport blocks, or a time interval from a time domain resource used to receive third scheduling information to a time domain resource included in third resources, where for example, if the time domain resource used to receive the second scheduling information is a time domain resource #C, and the time domain resource that may be used to retransmit some or all of the first transport blocks is a time domain resource #D, the time interval is from the time domain resource #C to the time domain resource #D; assuming that each of time domain resource lengths of the time domain resource #C and the time domain resource #D is a first time length, the time interval is a time period having (D-C) first time lengths.

The time domain resource that may be used to receive the second scheduling information, the time domain resource that may be used to receive the third scheduling information, and the time domain resource that may be used to retransmit some or all of the first transport blocks may be a time domain resource configured by using higher layer signaling or may be predefined.

In some possible embodiments, the method further includes: sending, by the network device, higher layer signaling, where the higher layer signaling includes a first threshold, so that the terminal device determines the first time interval and/or the second time interval based on the first threshold.

The network device sends, to the terminal device, the higher layer signaling carrying the first threshold, so that the terminal device determines, based on the first threshold, whether the time interval indicated by the third indication information is the first time interval or the second time interval, to prevent the network device from separately sending a specific first time interval or second time interval, thereby reducing control signaling overheads on a network, and increasing network transmission efficiency.

In some possible embodiments, the first scheduling information includes fourth indication information, the fourth indication information is used to indicate one of at least two modulation and coding scheme MCS values, a first MCS value of the at least two MCS values is used to indicate that some or all of the first transport blocks may be retransmitted, and a second MCS value of the at least two MCS values is used to indicate that some or all of the first transport blocks may not be retransmitted.

The network device sends the first scheduling information including the fourth indication information to the terminal device, so that the terminal device determines, based on the fourth indication information, whether the MCS value is the first MCS value or the second MCS value, and then can determine whether some or all of the first transport blocks may or may not be retransmitted. Whether some or all of the first transport blocks may or may not be retransmitted is "implicitly" indicated, without introducing an extra indication information field. In this way, information carried in the first scheduling information can be reduced, thereby reducing control signaling overheads on a network, and increasing network transmission efficiency.

In some possible embodiments, the first scheduling information is further used to indicate at least one of a modulation scheme used to retransmit some or all of the first transport blocks, a time-frequency domain resource used to retransmit the first transport blocks, a coding scheme used to retransmit the first transport blocks, reference signal information used to retransmit the first transport blocks, a redundancy version used to retransmit the first transport blocks, a code rate used to retransmit the first transport blocks, an antenna port used to retransmit the first transport blocks, precoding matrix indication information used to retransmit the first transport blocks, carrier indication information used to retransmit some or all of the first transport blocks, a time interval used to retransmit some or all of the first transport blocks, start information used to retransmit the first transport blocks, and a retransmission transmit power control command used to retransmit the first transport blocks.

The first scheduling information is used to indicate the coding scheme and the like used to retransmit some or all of the first transport blocks, so that information carried in the scheduling information used to instruct to retransmit some or all of the first transport blocks can be reduced, thereby reducing control signaling overheads on a network, and increasing network transmission efficiency.

In some possible embodiments, the method further includes: sending, by the network device, second scheduling information, where the second scheduling information is used to instruct the terminal device to retransmit some or all of the first transport blocks on second resources; and receiving, by the network device, some or all of the first transport blocks on the second resources.

The terminal device already performs the preparation operation for retransmitting the first transport blocks. Therefore, compared with a conventional solution, a time period for retransmitting the first transport blocks is reduced.

In some possible embodiments, the first scheduling information further includes third resources used to retransmit some or all of the first transport blocks, and the method further includes: sending, by the network device, third scheduling information, where the third scheduling information is used to instruct the terminal device to retransmit some or all of the first transport blocks; and receiving, by the network device, some or all of the first transport blocks on the third resources.

The first scheduling information is used to indicate the modulation scheme and the like used to retransmit some or all of the first transport blocks, and the third scheduling information includes indication information other than the first scheduling information. The terminal device already performs the preparation operation for retransmitting the first transport blocks. Therefore, compared with a conventional solution, a time period for retransmitting the first transport blocks is reduced. In addition, the first scheduling information can be used to reduce information carried in the scheduling information used to instruct to retransmit some or all of the first transport blocks, thereby reducing control signaling overheads on a network, and increasing network transmission efficiency.

According to a third aspect, a data sending method is provided, where the method includes: receiving, by a terminal device, first scheduling information, where the first scheduling information is used to indicate first resources, the first resources are resources used to send first transport blocks, the first scheduling information is further used to indicate a probability value, and the probability value is a block error rate for the first transport blocks that are received by a network device on the first resources or a probability that a network device successfully receives the first transport blocks on the first resources; and sending, by the terminal device, the first transport blocks on the first resources based on the first scheduling information.

The terminal device receives the first scheduling information used to indicate the first resources used to send the first transport blocks, the first scheduling information is further used to indicate the probability value, and the probability value may be the block error rate that is of the received first transport blocks and that is predicted by the network device or a probability that the first transport blocks are successfully received and that is predicted by the network device. In this way, the terminal device may determine, based on the probability value that the first transport blocks are successfully received and that is predicted by the network device, whether a preparation operation needs to be performed for retransmitting all or some of the first transport blocks, so that a time period for retransmitting some or all of the first transport blocks can be shortened, thereby reducing a retransmission delay.

In some possible embodiments, the probability value is a first probability value or a second probability value, the first probability value indicates that all or some of the first transport blocks are retransmitted, and the second probability value indicates that all or some of the first transport blocks are not retransmitted; or the probability value is a first probability value or a second probability value, the first probability value indicates that all or some of the first transport blocks may be retransmitted, and the second probability value indicates that some or all of the first transport blocks may not be retransmitted.

Whether the probability value is the first probability value or the second probability value may be determined by the terminal device or the network device. In this way, the terminal device may determine, based on whether the probability value is the first probability value or the second probability value, whether the preparation operation needs to be performed for retransmitting all or some of the first transport blocks, so that a time period for retransmitting some or all of the first transport blocks can be shortened, thereby reducing a transmission delay.

In some possible embodiments, the first scheduling information includes first indication information, the first indication information is used to indicate one of at least two modulation and coding scheme MCS tables, a first table of the at least two MCS tables is used to indicate the first probability value, and a second table of the at least two MCS tables is used to indicate the second probability value.

The terminal device determines, based on the first indication information, whether the MCS table is the first table or the second table, and then can "implicitly" determine whether the probability value is the first probability value or the second probability value, without introducing an extra indication information field. In this way, information carried in the first scheduling information can be reduced, thereby reducing control signaling overheads on a network, and increasing network transmission efficiency.

In some possible embodiments, the first scheduling information includes second indication information, the second indication information is at least one bit, a first bit status value of the at least one bit is used to indicate the first probability value, and a second bit status value of the at least one bit is used to indicate the second probability value.

The first bit status value of the at least one bit "explicitly" indicates the first probability value or the second probability value, that is, a dedicated indication information field is introduced, so that flexibility of indicating the probability value by the network device is improved.

In some possible embodiments, the first scheduling information includes third indication information, the third indication information is used to indicate one of at least two time intervals, a first time interval of the at least two time intervals is used to indicate the first probability value, and a second time interval of the at least two time intervals is used to indicate the second probability value.

The third indication information is used to indicate one of the at least two time intervals, the first time interval of the at least two time intervals is used to indicate the first probability value, and the second time interval of the at least two time intervals is used to indicate the second probability value. In other words, indication is "implicitly" performed, without introducing an extra indication information field. In this way, information carried in the first scheduling information can be reduced, thereby reducing control signaling overheads on a network, and increasing network transmission efficiency.

The at least two time intervals include at least one of the following time intervals:

a time interval from a time domain resource used to receive the first scheduling information to a first time domain resource included in the first resources, where for example, if the time domain resource for the first scheduling information is a time domain resource #A, and the first time domain resource included in the first resources is a time domain resource #B, the time interval is from the time domain resource #A to the time domain resource #B; assuming that each of time domain resource lengths of the time domain resource #A and the time domain resource #B is a first time length, the time interval is a time period having (B-A) first time lengths;

a time interval from a time domain resource used to receive the first scheduling information to a time domain resource that may be used to receive second scheduling information, or a time interval from a time domain resource used to receive the first scheduling information to a time domain resource that may be used to receive third scheduling information, where for example, if the time domain resource for the first scheduling information is a time domain resource #A, and the time domain resource that may be used to receive the second scheduling information is a time domain resource #C, the time interval is from the time domain resource #A to the time domain resource #C; assuming that each of time domain resource lengths of the time domain resource #A and the time domain resource #C is a first time length, the time interval is a time period having (C-A) first time lengths;

a time interval from a time domain resource used to receive the first scheduling information to a time domain resource that may be used to retransmit some or all of the first transport blocks, or a time interval from a time domain resource used to receive the first scheduling information to a time domain resource included in second resources, or a time interval from a time domain resource used to receive the first scheduling information to a time domain resource included in third resources, where for example, if the time domain resource for the first scheduling information is a time domain resource #A, and the time domain resource that may be used to retransmit some or all of the first transport blocks is a time domain resource #D, the time interval is from the time domain resource #A to the time domain resource #D; assuming that each of time domain resource lengths of the time domain resource #A and the time domain resource #D is a first time length, the time interval is a time period having (D-A) first time lengths;

a time interval from a first time domain resource included in the first resources to a time domain resource that may be used to retransmit some or all of the first transport blocks, or a time interval from a first time domain resource included in the first resources to a second time resource included in second resources, where for example, if the first time domain resource included in the first resources is a time domain resource #B, and the time domain resource that may be used to retransmit some or all of the first transport blocks is a time domain resource #D, the time interval is from the time domain resource #B to the time domain resource #D; assuming that each of time domain resource lengths of the time domain resource #B and the time domain resource #D is a first time length, the time interval is a time period having (D-B) first time lengths;

a time interval from a first time domain resource included in the first resources to a time domain resource that may be used to receive second scheduling information, or a time interval from a first time domain resource included in the first resources to a time domain resource that may be used to receive third scheduling information, where for example, if the first time domain resource included in the first resources is a time domain resource #B, and the time domain resource that may be used to receive the second scheduling information is a time domain resource #C, the time interval is from the time domain resource #B to the time domain resource #C; assuming that each of time domain resource lengths of the time domain resource #B and the time domain resource #C is a first time length, the time interval is a time period having (C-B) first time lengths; and a time interval from a time domain resource used to receive second scheduling information to a time domain resource that may be used to retransmit some or all of the first transport blocks, or a time interval from a time domain resource used to receive second scheduling information to a time domain resource included in second resources, or a time interval from a time domain resource used to receive third scheduling information to a time domain resource that may be used to retransmit some or all of the first transport blocks, or a time interval from a time domain resource used to receive third scheduling information to a time domain resource included in third resources, where for example, if the time domain resource used to receive the second scheduling information is a time domain resource #C, and the time domain resource that may be used to retransmit some or all of the first transport blocks is a time domain resource #D, the time interval is from the time domain resource #C to the time domain resource #D; assuming that each of time domain resource lengths of the time domain resource #C and the time domain resource #D is a first time length, the time interval is a time period having (D-C) first time lengths.

The time domain resource that may be used to receive the second scheduling information, the time domain resource that may be used to receive the third scheduling information, and the time domain resource that may be used to retransmit some or all of the first transport blocks may be a time domain resource configured by using higher layer signaling or may be predefined.

In some possible embodiments, the first scheduling information includes fourth indication information, the fourth indication information is used to indicate one of at least two modulation and coding scheme MCS values, a first MCS value of the at least two MCS values is used to indicate the first probability value, and a second MCS value of the at least two MCS values is used to indicate the second probability value.

The terminal device determines, based on the fourth indication information, whether the MCS value is the first MCS value or the second MCS value, and then can "implicitly" determine whether the probability value is the first probability value or the second probability value, without introducing an extra indication information field. In this way, information carried in the first scheduling information can be reduced, thereby reducing control signaling overheads on a network, and increasing network transmission efficiency.

In some possible embodiments, the method further includes: receiving, by the terminal device, higher layer signaling, where the higher layer signaling includes a first threshold; and determining, by the terminal device, the first time interval and/or the second time interval based on the first threshold.

The terminal device may set a time interval that is indicated by the third indication information and that is greater than the first threshold as the first time interval, and set a time interval that is indicated by the third indication information and that is less than or equal to the first threshold as the second time interval. Alternatively, a reverse setting may be performed. In this way, the terminal device may determine whether the probability value is the first probability value or the second probability value, to determine whether a preparation operation needs to be performed for retransmitting all or some of the first transport blocks, so that a time period for retransmitting some or all of the first transport blocks can be shortened.

In some possible embodiments, the method further includes: performing, by the terminal device, a preparation operation for retransmitting the first transport blocks, where the terminal device determines the first probability value.

If the terminal device determines the first probability value based on the first scheduling information, the terminal device performs the preparation operation. In this way, the terminal device may retransmit some or all of the first transport blocks within a relatively short time period, thereby reducing a delay for retransmitting some or all of the first transport blocks.

In some possible embodiments, the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a transmit power control command used to retransmit some or all of the first transport blocks.

The first scheduling information is used to indicate the coding scheme and the like used to retransmit some or all of the first transport blocks, so that information carried in the scheduling information used to instruct to retransmit some or all of the first transport blocks can be reduced, thereby reducing control signaling overheads on a network, and increasing network transmission efficiency.

In some possible embodiments, the method further includes: receiving, by the terminal device, second scheduling information, where the second scheduling information is used to instruct the terminal device to retransmit some or all of the first transport blocks on second resources; and retransmitting, by the terminal device, some or all of the first transport blocks on the second resources based on the second scheduling information.

When the terminal device already learns that the probability value is the first probability value, the terminal device may perform the preparation operation before receiving the second scheduling information. A time period for retransmitting some or all of the first transport blocks is reduced when compared with that in a conventional solution.

In some possible embodiments, the method further includes: receiving, by the terminal device, third scheduling information, where the third scheduling information is used to instruct the terminal device to retransmit some or all of the first transport blocks; and retransmitting, by the terminal device, some or all of the first transport blocks on third resources based on the third scheduling information and the first scheduling information.

The first scheduling information is used to indicate the modulation scheme and the like used to retransmit some or all of the first transport blocks, and the third scheduling information includes indication information other than the first scheduling information. The terminal device determines the third resources based on the third scheduling information and/or the first scheduling information, and retransmits some or all of the first transport blocks on the third resources.

According to a fourth aspect, a data receiving method is provided, including: sending, by a network device, first scheduling information, where the first scheduling information is used to indicate first resources, the first resources are resources used to send first transport blocks, the first scheduling information is further used to indicate a probability value, and the probability value is a block error rate for the first transport blocks that are received by the network device on the first resources or a probability that the network device successfully receives the first transport blocks on the first resources; and receiving, by the network device, the first transport blocks on the first resources.

The network device sends, to a terminal device, the first scheduling information used to indicate the first resources used to send the first transport blocks, the first scheduling information is further used to indicate the probability value, and the probability value may be the block error rate that is of the received first transport blocks and that is predicted by the network device or the probability that the first transport blocks are successfully received and that is predicted by the network device, so that the terminal device may determine, based on the probability value that the first transport blocks are successfully received and that is predicted by the network device, whether a preparation operation needs to be performed for retransmitting all or some of the first transport blocks. In this way, a time period for retransmitting some or all of the first transport blocks can be shortened, thereby reducing a transmission delay.

In some possible embodiments, the probability value is a first probability value or a second probability value, the first probability value indicates that all or some of the first transport blocks are retransmitted, and the second probability value indicates that all or some of the first transport blocks are not retransmitted; or the probability value is a first probability value or a second probability value, the first probability value indicates that all or some of the first transport blocks may be retransmitted, and the second probability value indicates that some or all of the first transport blocks may not be retransmitted.

Whether the probability value is the first probability value or the second probability value may be determined by the terminal device or the network device. The network device may determine, based on whether the probability value is the first probability value or the second probability value, whether the preparation operation needs to be performed for retransmitting all or some of the first transport blocks, so that a time period for retransmitting some or all of the first transport blocks can be shortened, thereby reducing a transmission delay.

In some possible embodiments, the first scheduling information includes first indication information, the first indication information is used to indicate one of at least two modulation and coding scheme MCS tables, a first table of the at least two MCS tables is used to indicate the first probability value, and a second table of the at least two MCS tables is used to indicate the second probability value.

The network device sends the first scheduling information including the first indication information to the terminal device, so that the terminal device determines, based on the first indication information, whether the MCS table is the first table or the second table, and then can "implicitly" determine whether the probability value is the first probability value or the second probability value, without introducing an extra indication information field. In this way, information carried in the first scheduling information can be reduced, thereby reducing control signaling overheads on a network, and increasing network transmission efficiency.

In some possible embodiments, the first scheduling information includes second indication information, the second indication information is at least one bit, a first bit status value of the at least one bit is used to indicate the first probability value, and a second bit status value of the at least one bit is used to indicate the second probability value.

The network device sends the first scheduling information including the first indication information to the terminal device, so that the terminal device determines the first probability value or the second probability value through "explicit" indication. That is, a dedicated indication information field is introduced. In this way, flexibility of indicating the probability value by the network device is improved.

In some possible embodiments, the first scheduling information includes third indication information, the third indication information is used to indicate one of at least two time intervals, a first time interval of the at least two time intervals is used to indicate the first probability value, and a second time interval of the at least two time intervals is used to indicate the second probability value.

The network device sends the first scheduling information including the third indication information to the terminal device, the third indication information is used to indicate one of the at least two time intervals, the first time interval of the at least two time intervals is used to indicate the first probability value, and the second time interval of the at least two time intervals is used to indicate the second probability value. In other words, indication is "implicitly" performed, without introducing an extra indication information field. In this way, information carried in the first scheduling information can be reduced, thereby reducing control signaling overheads on a network, and increasing network transmission efficiency.

In some possible embodiments, the first scheduling information includes fourth indication information, the fourth indication information is used to indicate one of at least two modulation and coding scheme MCS values, a first MCS value of the at least two MCS values is used to indicate the first probability value, and a second MCS value of the at least two MCS values is used to indicate the second probability value.

The network device sends the first scheduling information including the fourth indication information to the terminal device, so that the terminal device determines, based on the fourth indication information, whether the MCS value is the first MCS value or the second MCS value, and then can determine, through "implicit" indication, whether the probability value is the first probability value or the second probability value, without introducing an extra indication information field. In this way, information carried in the first scheduling information can be reduced, thereby reducing control signaling overheads on a network, and increasing network transmission efficiency.

In some possible embodiments, the method further includes: sending, by the network device, higher layer signaling, where the higher layer signaling includes a first threshold, and the first threshold is used by the terminal device to determine the first time interval and/or the second time interval.

The network device may preset the first threshold, and send the first threshold to the terminal device by using the higher layer signaling. The terminal device may set a time interval that is indicated by the third indication information and that is greater than the first threshold as the first time interval, and set a time interval that is indicated by the third indication information and that is less than or equal to the first threshold as the second time interval. Alternatively, a reverse setting may be performed. In this way, the terminal device may determine whether the probability value is the first probability value or the second probability value, to determine whether the preparation operation needs to be performed for retransmitting all or some of the first transport blocks, so that a time period for retransmitting some or all of the first transport blocks can be shortened.

In some possible embodiments, the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, start information used to retransmit some or all of the first transport blocks, and a transmit power control command used to retransmit some or all of the first transport blocks.

The first scheduling information is used to indicate the coding scheme and the like used to retransmit some or all of the first transport blocks, so that information carried in the scheduling information used to instruct to retransmit some or all of the first transport blocks can be reduced, thereby reducing control signaling overheads on a network, and increasing network transmission efficiency.

In some possible embodiments, the method further includes: sending, by the network device, second scheduling information, where the second scheduling information is used to instruct the terminal device to retransmit some or all of the first transport blocks on second resources; and receiving, by the network device, some or all of the first transport blocks on the second resources.

When the terminal device already learns that the probability value is the first probability value, the terminal device may perform the preparation operation before receiving the second scheduling information. A time period for retransmitting some or all of the first transport blocks is reduced when compared with that in a conventional solution.

In some possible embodiments, the method further includes: sending, by the network device, third scheduling information, where the third scheduling information is used to instruct the terminal device to retransmit some or all of the first transport blocks; and receiving, by the network device, some or all of the first transport blocks on third resources.

The first scheduling information is used to indicate the modulation scheme and the like used to retransmit some or all of the first transport blocks, and the third scheduling information includes indication information other than the first scheduling information. The network device receives, on the third resources, some or all of the first transport blocks that are retransmitted by the terminal device on the third resources.

According to a fifth aspect, a terminal device is provided, and the terminal device includes modules configured to perform the method in any one of the first aspect or the possible embodiments of the first aspect.

According to a sixth aspect, a network device is provided, and the terminal device includes modules configured to perform the method in any one of the second aspect or the possible embodiments of the second aspect.

According to a seventh aspect, a terminal device is provided, and the terminal device includes modules configured to perform the method in any one of the third aspect or the possible embodiments of the third aspect.

According to an eighth aspect, a network device is provided, and the terminal device includes modules configured to perform the method in any one of the fourth aspect or the possible embodiments of the fourth aspect.

According to a ninth aspect, a system is provided, and the system includes:
the terminal device in the fifth aspect and the network device in the sixth aspect.

According to a tenth aspect, a system is provided, and the system includes:
the terminal device in the seventh aspect and the network device in the eighth aspect.

According to an eleventh aspect, a terminal device is provided, including: a processor, a memory, and a communications interface. The processor and the memory are connected to the communications interface. The memory is configured to store an instruction. The processor is configured to execute the instruction. The communications interface is configured to communicate with another network element under control of the processor. When the processor executes the instruction stored in the memory, the processor is enabled to perform the method in any one of the first aspect or the possible embodiments of the first aspect.

According to a twelfth aspect, a network device is provided, including: a processor, a memory, and a communications interface. The processor and the memory are connected to the communications interface. The memory is configured to store an instruction. The processor is configured to execute the instruction. The communications interface is configured to communicate with another network element under control of the processor. When the processor executes the instruction stored in the memory, the processor is enabled to perform the method in any one of the second aspect or the possible embodiments of the second aspect.

According to a thirteenth aspect, a terminal device is provided, including: a processor, a memory, and a communications interface. The processor and the memory are connected to the communications interface. The memory is configured to store an instruction. The processor is configured to execute the instruction. The communications interface is configured to communicate with another network element under control of the processor. When the processor executes the instruction stored in the memory, the processor is enabled to perform the method in any one of the third aspect or the possible embodiments of the third aspect.

According to a fourteenth aspect, a network device is provided, including: a processor, a memory, and a communications interface. The processor and the memory are connected to the communications interface. The memory is configured to store an instruction. The processor is configured to execute the instruction. The communications interface is configured to communicate with another network element under control of the processor. When the processor executes the instruction stored in the memory, the processor is enabled to perform the method in any one of the fourth aspect or the possible embodiments of the fourth aspect.

According to a fifteenth aspect, a computer storage medium is provided, where the computer storage medium stores program code, and the program code is used to indicate an instruction used to perform the data sending method in any one of the first aspect or the possible embodiments of the first aspect.

According to a sixteenth aspect, a computer storage medium is provided, where the computer storage medium stores program code, and the program code is used to indicate an instruction used to perform the data sending method in any one of the second aspect or the possible embodiments of the second aspect.

According to a seventeenth aspect, a computer storage medium is provided, where the computer storage medium stores program code, and the program code is used to indicate an instruction used to perform the data sending method in any one of the third aspect or the possible embodiments of the third aspect.

According to an eighteenth aspect, a computer storage medium is provided, where the computer storage medium stores program code, and the program code is used to indicate an instruction used to perform the data sending method in any one of the fourth aspect or the possible embodiments of the fourth aspect.

Based on the foregoing technical solutions, the terminal device receives the first scheduling information used to indicate the first resources used to send the first transport blocks and to indicate the probability value that the terminal device sends the first transport blocks, and sends the first transport blocks on the first resources based on the first scheduling information. In this way, the terminal device may determine, based on the probability value, whether all or some of the first transport blocks need to be retransmitted, and perform the preparation operation when the terminal device determines that the first transport blocks need to be retransmitted, so that a time period for retransmitting some or all of the first transport blocks can be shortened, thereby reducing a transmission delay.

DESCRIPTION OF EMBODIMENTS

Figure 1:
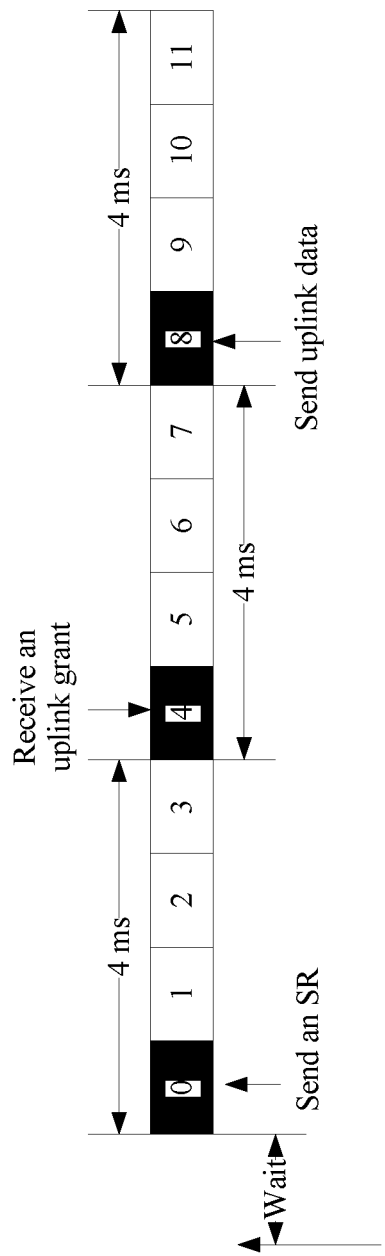
FIG. 1 is a schematic diagram of data channel transmission according to a conventional solution.

The following describes technical solutions of this application with reference to accompanying drawings.

The technical solutions of embodiments of this application may be applied to various communications system based on access standards, such as a global system for mobile communications (GSM), a code division multiple access (CDMA) system, wideband code division multiple access WCDMA), a general packet radio service (GPRS), long term evolution (LTE), an LTE frequency division duplex (FDD) system, LTE time division duplex (TDD), a universal mobile telecommunications system (UMTS), a wireless cellular network system, and a new generation wireless communications system (NR). The LTE system and the NR system are used as an example in the embodiments of this application for description. However, this is not limited in this application.

It should be further understood that, in the embodiments of this application, user equipment (UE) may be referred to as a terminal, a mobile station (MS), a mobile terminal, or the like. The user equipment may communicate with one or more core networks through a radio access network (RAN). The UE may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. The UE may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future fifth-generation (5G) network.

Resources used in the embodiments of this application may include scheduling resources or scheduling-free resources. Alternatively, in the embodiments of this application, each communications device (such as a network device or a terminal device) in a communications system may perform communication based on a scheduling-free transmission solution by using resources, or perform communication in a scheduling manner by using resources. This is not specifically limited in the embodiments of this application.

In scheduling-based transmission, a resource used by a terminal device to transmit data needs to be allocated by a network device and be notified to the terminal device.

That is, in the embodiments of this application, data transmission may be based on scheduling by a base station, and a basic time unit of the scheduling is one or more time resources. A time length of a time resource may be one or more symbols, one or more symbol groups, one or more mini-slots, one or more slots, or one or more subframes. A symbol may be a symbol for which one subcarrier is located in frequency domain 15 kHz, or a symbol that is of a communications system and for which one subcarrier is located in frequency domain greater than 15 kHz. A slot is a slot for which one subcarrier is located in frequency domain 15 kHz, or a slot that is of the communications system and for which one subcarrier is located in frequency domain greater than 15 kHz, and may have a length less than 0.5 ms. A mini-slot is a mini-slot for which one subcarrier is located in frequency domain 60 kHz, or a slot that is of another communications system and for which one subcarrier is located in frequency domain, and may have a length less than that of the slot. A subframe is a subframe for which one subcarrier is located in frequency domain 15 kHz, or a subframe that is of the communications system and for which one subcarrier is located in frequency domain greater than 15 kHz, and may have a length less than 1 ms. This is not limited in the embodiments. For example, a frequency domain in which a subcarrier is located and that is greater than 15 kHz may be 30 kHz, 60 kHz, or 120 kHz. This is not limited in the embodiments.

A time domain resource is one or more time resources.

A frequency domain resource may be one or more subcarriers, one or more short physical resource blocks (SPRB), one or more short physical resource block groups (SRBG), one or more short virtual resource blocks (SVRB), one or more subcarrier groups, one or more carriers, or one or more carrier groups. An SPRB and an SVRB are basic units of resource allocation that have different meanings. The SPRB includes y consecutive subcarriers in frequency domain, and is a resource having one transmission time length in time domain. The transmission time length may be any symbol quantity that is from 1 to x, and x and y are positive integers.

During centralized resource allocation, the SVRB and the SPRB have a same definition; and during distributive resource allocation, there is a correspondence between the SVRB and the SPRB. Because an SPRB index is an index of an SPRB, and an SVRB index is an index of an SVRB, the SPRB index and the SVRB index may be different. An SRBG may include a plurality of SPRBs, and a quantity of SPRBs included in the SRBG is determined based on bandwidth of the terminal device or is indicated by the network device. The SPRB index may be a number of the SPRB, an SRBG index may be a number of the SRBG, the SVRB index may be a number of the SVRB, a subcarrier index may be a number of a subcarrier, and a subcarrier group index may be a number of a subcarrier group. The subcarrier group includes at least one subcarrier. A frequency domain in which a subcarrier is located herein may be equal to or greater than 15 kHz.

A specific scheduling procedure is as follows: A base station sends a control channel, where the control channel may carry scheduling information using different downlink control information (DCI) formats, and the scheduling information includes control information, such as resource allocation information or a modulation and coding scheme. The terminal device detects the control channel on one or more time resources, and receives a downlink data channel or send an uplink data channel based on the scheduling information carried in the detected control channel.

In addition, in recent years, due to an excessively long access time of a delay-sensitive user, researchers have proposed an uplink scheduling-free transmission solution, referred to herein as a grant-free transmission. Grant-free transmission is a method in which uplink transmission is implemented on user data without scheduling by a network device, to reduce a time period used for an uplink access process.

In the embodiments of this application, scheduling-free transmission may be understood as any one of the following meanings, or a plurality of meanings, or a combination of some technical features in a plurality of meanings or other similar meanings:

The scheduling-free transmission may be as follows: The network device allocates a plurality of transmission resources in advance and notifies a terminal device of the transmission resources; when the terminal device has an uplink data transmission requirement, the terminal device selects at least one transmission resource from the plurality of transmission resources allocated by the network device in advance, and sends uplink data by using the selected transmission resource; and the network device detects, on one or more of the plurality of transmission resources that are allocated in advance, the uplink data sent by the terminal device. The detection may be blind detection, or may be performed based on a control field in the uplink data, or may be performed in another manner.

The scheduling-free transmission may be as follows: The network device allocates a plurality of transmission resources in advance and notifies a terminal device of the transmission resources, so that when the terminal device has an uplink data transmission requirement, the terminal device selects at least one transmission resource from the plurality of transmission resources allocated by the network device in advance, and sends uplink data by using the selected transmission resource.

The scheduling-free transmission may be as follows: Information about a plurality of transmission resources allocated in advance is obtained, at least one transmission resource is selected from the plurality of transmission resources when there is an uplink data transmission requirement, and uplink data is sent by using the selected transmission resource. The information may be obtained from the network device or predefined.

The scheduling-free transmission may be a method in which uplink data of a terminal device may be transmitted without dynamic scheduling by the network device, and the dynamic scheduling may be a scheduling manner in which the network device indicates a transmission resource by using signaling for transmitting uplink data by the terminal device each time. Optionally, transmitting the uplink data by the terminal device may be understood as allowing performance of uplink data transmission on data of two or more terminal devices on a same time-frequency resource. Optionally, the transmission resource may be a transmission resource of one or more time domain resources after a moment at which the terminal device receives the signaling.

The scheduling-free transmission may be as follows: A terminal device transmits uplink data without obtaining a grant from the network device. The granting may be as follows: The terminal device sends an uplink scheduling request to the network device, and the network device sends an uplink grant to the terminal device after receiving the scheduling request, where the uplink grant indicates an uplink transmission resource allocated to the terminal device.

The scheduling-free transmission may be a contention-based transmission manner, which may specifically mean that a plurality of terminals simultaneously transmit uplink data on a same time-frequency resource allocated in advance, without being granted by the base station.

Higher layer signaling may be signaling sent by a higher protocol layer, and the higher protocol layer is at least one of protocol layers above a physical layer. The higher protocol layer may be specifically at least one of the following protocol layers: a medium access control (MAC) layer, a radio link control (RLC) layer, a packet data convergence protocol (PDCP) layer, a radio resource control (RRC) layer, a non-access stratum (NAS) layer, and the like.

The data may be service data or higher layer signaling data.

In the embodiments of this application, the network device may be a network device (BTS) in GSM, a NodeB (NB) in WCDMA, an evolved NodeB (ENB or e-NodeB) in LTE, or a new generation NodeB (gNodeB). This is not limited in this embodiment of this application. However, for ease of description, the ENB is used as an example in the following embodiments for description.

Time domain in a long term evolution-advanced (LTE-A) system is identified by using a radio frame, each radio frame includes 10 subframes having a length of 1 millisecond (ms), and each subframe includes two slots (slot). For a normal cyclic prefix (normal CP), each slot includes seven symbols. For an extended cyclic prefix, each slot includes six symbols. A resource element is a symbol in time, and is a subcarrier in frequency. An uplink symbol is referred to as a single carrier frequency division multiple access (SC-FDMA) symbol, and a downlink symbol is referred to as an orthogonal frequency division multiplexing (OFDM) symbol.

It should be noted that, if an uplink multiple access manner of orthogonal frequency division multiple access (OFDMA) is introduced to a subsequent technology, the uplink symbol may also be referred to as an OFDM symbol. In the embodiments of this application, both the uplink symbol and the downlink symbol may be referred to as "symbols". Data packets whose transmission time interval (TTI) is reduced to one symbol to 0.5 ms are collectively referred to as sTTI data packets. Alternatively, data packets whose TTI is not greater than 1 ms are referred to as sTTI data packets.

There are a plurality of OFDM symbols or SC-FDMA symbols in the new radio (NR) system. However, a length depends on different subcarrier spacings. For example, if a subcarrier spacing is 15 kHz, a slot length is 0.5 ms; or if a subcarrier spacing is greater than 15 kHz, a slot length is less than 0.5 ms. The NR system may include a plurality of different subcarrier spacings, and one subcarrier spacing is referred to as one numerology. Time lengths of symbols are different in case of different numerologies.

A plurality of different service types exist in the fifth-generation mobile NR system, and the plurality of service types respectively correspond to different service requirements. For example, ultra-reliable and low-latency communications (uRLLC) requires a short delay and high reliability, that is, transmission succeeds within 1 ms; an enhanced mobile broadband (eMBB) poses a spectral efficiency requirement instead of a delay requirement; and massive machine type communications (mMTC) requires periodic low-power sending.

FIG. 1 is a schematic diagram of sending an uplink data channel by UE. As shown in FIG. 1, in an LTE-A system, a procedure in which a terminal device obtains a scheduling resource and sends the uplink data channel include the following steps:

(1) The UE waits for a time for sending a scheduling request (SR), for example, a waiting time period in FIG. 1.

(2) The UE sends the SR in a time period 0, and waits in time periods 1, 2, and 3 for a network device to receive the SR. For ease of description herein, a time period may be numbered, and a length of a time period corresponding to each number is 1 ms.

(3) An eNB receives the SR and generates scheduling information, and sends the scheduling information to the UE. As shown in FIG. 1, the UE receives the scheduling information in a time period 4. When the eNB generates the scheduling information, the eNB does not learn an actual data volume that needs to be sent by the UE.

(4) The UE performs a preparation operation for transmitting the data channel in time periods 5, 6, and 7, such as packet assembling or encoding.

(5) The UE sends the uplink data channel in a time period 8, where information about a buffer status report (BSR) of the UE and a first transport block are carried on the uplink data channel; and a base station demodulates the uplink data channel to obtain the BSR, and learns, based on the BSR, that not all the data volume of the UE is sent. Therefore, the base station further sends at least one piece of scheduling information to instruct the UE to send a remaining data volume, until the UE has no uplink data for transmission.

Figure 2:
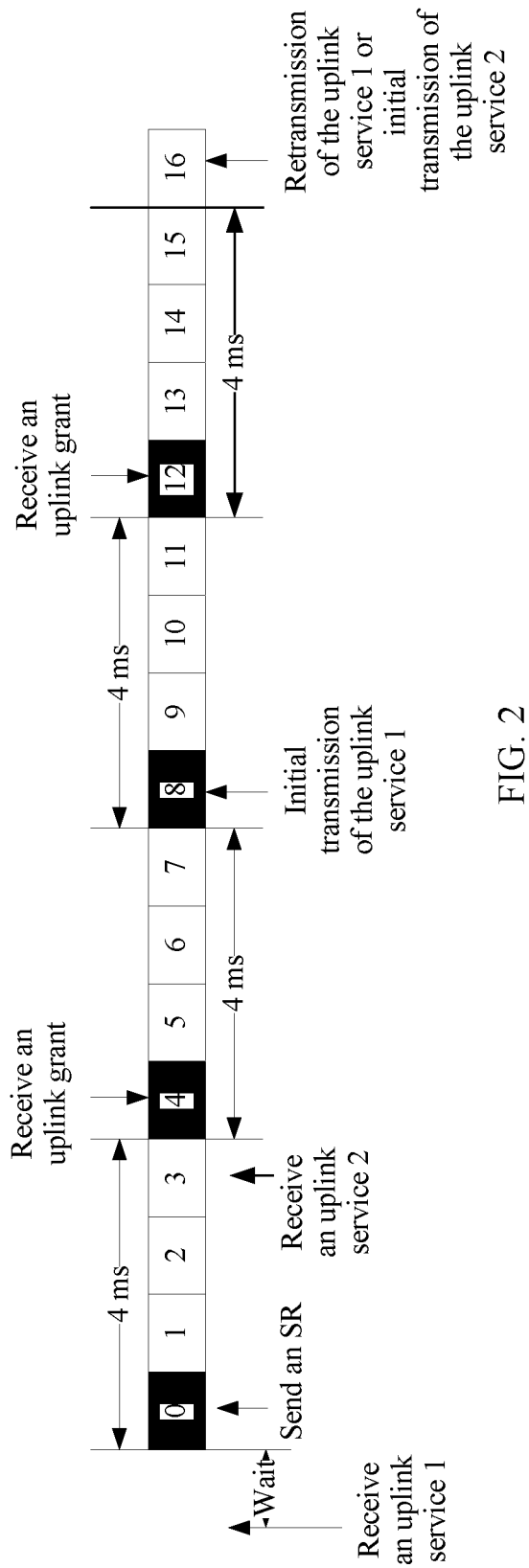
FIG. 2 is a schematic diagram of data channel retransmission according to a conventional solution.

When the network device determines that the UE needs to retransmit the first transport block, a retransmission instruction for instructing the UE to retransmit the first transport block may be carried in retransmission scheduling information. For example, the retransmission instruction for retransmitting the first transport block is carried in scheduling information in a time period 12 in FIG. 2. In this way, the UE starts to assemble to-be-retransmitted packets after the time period 12, and specifically, the UE may perform encoding preparation and the like. In this way, a time period from receiving initial transmission scheduling information by the UE to performing initial transmission is the same as a time period from receiving retransmission scheduling information to performing retransmission. That is, a time period from the time period 4 to the time period 8 is the same as a time period from the time period 12 to a time period 16. Therefore, if the first transport block is used to transmit a URLLC service that requires a relatively low transmission delay, when the first transport block needs to be retransmitted, it is difficult to meet the requirement of relatively low transmission delay by using an existing technical solution. For example, in the solution, it is difficult to meet a requirement for correctly transmitting the URLLC service at a probability 1 to $10e^{-5}$ within 1 ms.

Figure 3:
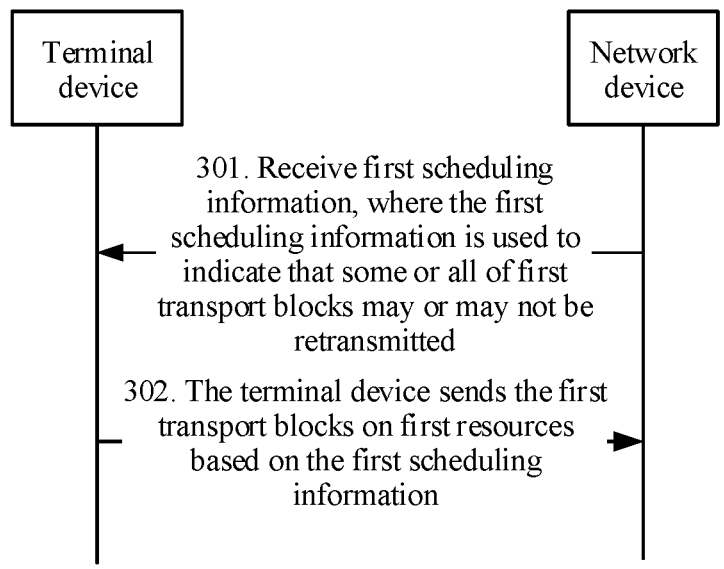
FIG. 3 is a schematic flowchart of a data sending method according to an embodiment of this application.

FIG. 3 is a schematic flowchart of a data sending method according to an embodiment of this application. As shown in FIG. 3, the method may be performed by a terminal device, and the method includes the following steps:

301: The terminal device receives first scheduling information, where the first scheduling information is used to indicate first resources, the first resources are resources used to send first transport blocks, and the first scheduling information is further used to indicate that some or all of the first transport blocks may be retransmitted, or that some or all of the first transport blocks may not be retransmitted.

302: The terminal device sends the first transport blocks on the first resources based on the first scheduling information.

Specifically, the terminal device receives the first scheduling information, and the first scheduling information is used to indicate the first resources used to send the first transport blocks, so that the terminal device may transmit the first transport blocks on the first resources. The first resources include a first time domain resource and/or a first frequency domain resource. In addition, the first scheduling information is further used to indicate whether some or all of the first transport blocks may be retransmitted. To be specific, a network device may predict whether some or all of the first transport blocks may be retransmitted, and notify, by using the first scheduling information, the terminal device whether some or all of the first transport blocks may be retransmitted. If the terminal device determines, based on the first scheduling information, that some or all of the first transport blocks may be retransmitted, before the terminal device receives second scheduling information or third scheduling information used to instruct the terminal device to retransmit some or all of the first transport blocks, the terminal device may determine whether a preparation operation needs to be performed for retransmitting some or all of the first transport blocks, so that a time period for retransmitting some or all of the first transport blocks can be shortened. In other words, in this embodiment of this application, a time period from the second scheduling information or the third scheduling information to retransmitting some or all of the first transport blocks is shorter than a time period from the first scheduling information to transmitting the first transport blocks, thereby reducing a retransmission delay.

It should be understood that the network device may predict a transmission demodulation error probability of the first transport blocks. When the demodulation error probability is relatively high, the network device predicts that some or all of the first transport blocks may be retransmitted; or when the demodulation error probability is relatively low, the network device predicts that some or all of the first transport blocks may not be retransmitted. Further, when the demodulation error probability is equal to or greater than a first threshold value, it is considered that the demodulation error probability is relatively high; or when the demodulation error probability is equal to or less than a first threshold value, it is considered that the demodulation error probability is relatively low.

It should be noted that there may be one or more first transport blocks.

It should be noted that the terminal device determines, based on at least one of higher layer signaling, the first scheduling information, the second scheduling information, and the third scheduling information, to retransmit some of the first transport blocks or all of the first transport blocks. The terminal device may determine to retransmit some of the first transport blocks or all of the first transport blocks. Some of the first transport blocks may be at least one code block or at least one code block group. This is not limited in this application. If the terminal device determines to retransmit some of the first transport blocks, sizes of the to-be-retransmitted transport blocks are reduced when compared with those in a conventional solution, thereby increasing network resource utilization.

It should be noted that, if the first scheduling information received by the terminal device indicates that some of the first transport blocks may be retransmitted, the scheduling information may further indicate specific locations of the some to-be-retransmitted first transport blocks in the first transport blocks; or the terminal device and the network device may agree in advance on specific locations of the some to-be-retransmitted first transport blocks. This is not limited in this application. In addition, for ease of description, unless otherwise stated, retransmitting first transport blocks in the following embodiments may be retransmitting all of the first transport blocks or retransmitting some of the first transport blocks.

It should be understood that the terminal device performs the preparation operation for retransmitting the first transport blocks, and the preparation operation includes at least one of the following: coding processing, configuring higher layer configuration information, and receiving the higher layer configuration information. For the coding processing, the terminal device may encode at least one code block at a preset code rate by using a coding scheme of a Turbo parallel concatenated convolutional code (PCCC), a low-density parity-check code (LDPC), a convolutional code (CC), a tail biting convolutional code (TBCC), or a polar code, or may perform one or a combination of the following processing: scrambling, modulation, layer mapping, and precoding after encoding at least one code block at a preset code rate by using a coding scheme of Turbo, a PCCC, an LDPC, a CC, or a TBCC.

It should be further understood that, for ease of description, initially transmitting the first transport blocks may be expressed as "initial transmission" or "transmission", and transmitting some or all of the first transport blocks again may be expressed as "retransmission".

It should be further understood that a first transport block is a basic unit carrying at least data information and/or control information, and the data information and/or the control information may be included in one transport block (or a plurality of transport blocks). Any transport block meeting the feature may be used as the first transport block. The first transport block is not limited in this application. The control information may be uplink control information (UCI), and the uplink control information may include at least one of the following: channel state information (CSI), a hybrid automatic repeat request (HARD), a rank indicator (RI), a precoding matrix indicator (PMI), a channel quality indicator (CQI), and the like.

Therefore, in the data sending method in this embodiment of this application, the first scheduling information used to indicate the first resources used to send the first transport blocks and to indicate that some or all of the first transport blocks may or may not be retransmitted is received, and the first transport blocks are sent on the first resources based on the first scheduling information. In this way, the terminal device may determine, in advance based on whether some or all of the first transport blocks may or may not be retransmitted, whether the preparation operation needs to be performed for retransmitting the first transport blocks, and then perform the preparation operation in advance after determining that the first transport blocks may be retransmitted, before the terminal device receives the second scheduling information or the third scheduling information used to instruct the terminal device to retransmit some or all of the first transport blocks. Therefore, a time period for retransmitting the first transport blocks is reduced.

Optionally, the terminal device may further receive second scheduling information, the second scheduling information is used to instruct the terminal device to retransmit the first transport blocks, the second scheduling information is used to indicate second resources, and the second resources are resources used to retransmit the first transport blocks. In this way, the terminal device may retransmit the first transport blocks on the second resources based on the second scheduling information. When the terminal device already learns that the first transport blocks may be retransmitted, the terminal device may perform the preparation operation before receiving the second scheduling information. Therefore, a time domain resource included in the second resources is usually earlier than a time domain resource that is determined based on the conventional solution and that is used to retransmit the first transport blocks. A time period for retransmitting the first transport blocks is reduced when compared with that in the conventional solution.

It should be understood that the second resources include a second time domain resource and/or a second frequency domain resource.

Optionally, the network device may predict that the first transport blocks may or may not be retransmitted. The network device indicates indication information related to the retransmission of the first transport blocks to the terminal device by using the first scheduling information.

Optionally, the terminal device receives third scheduling information, the third scheduling information is used to instruct the terminal device to retransmit the first transport blocks, the terminal device receives the third scheduling information and/or the first scheduling information, and determines third resources, and the terminal device retransmits the first transport blocks on the third resources.

It should be understood that the third resources may include a third time domain resource and/or a third frequency domain resource.

It should be further understood that the third time domain resource included in the third resources may be the same as or different from the second time domain resource included in the second resources. This is not limited in this application.

Optionally, the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a transmit power control command used to retransmit some or all of the first transport blocks. The indication information related to the retransmission of the first transport blocks is at least one of the foregoing information.

Specifically, the modulation scheme used to retransmit some or all of the first transport blocks may be quadrature phase shift keying (QPSK), 16 quadrature amplitude modulation (16 QAM), 64 QAM, 256 QAM, 512 QAM, or 1024 QAM. This is not limited in the present invention.

Specifically, the time-frequency domain resource used to retransmit some or all of the first transport blocks may be one or more time domain resources and/or one or more frequency domain resources. This is not limited in the present invention.

Specifically, the coding scheme used to retransmit some or all of the first transport blocks may be Turbo, a PCCC, an LDPC, a CC, a TBCC, or polar. This is not limited in the present invention.

Specifically, the reference signal information used to retransmit some or all of the first transport blocks may be sending location information of a reference signal, a sequence of the reference signal, and/or a comb structure of the reference signal. This is not limited in the present invention.

Specifically, the redundancy version used to retransmit some or all of the first transport blocks may be 0, 1, 2, or 3. This is not limited in the present invention.

Specifically, the code rate used to retransmit some or all of the first transport blocks may be any positive number greater than 0. This is not limited in the present invention.

Specifically, the antenna port used to retransmit some or all of the first transport blocks may be any antenna port number. This is not limited in the present invention.

Specifically, the precoding matrix indication information used to retransmit some or all of the first transport blocks may be precoding indications of one or more beams. This is not limited in the present invention.

Specifically, the carrier indication information used to retransmit some or all of the first transport blocks may be a carrier index number or a carrier group index number. This is not limited in the present invention.

Specifically, the time interval used to retransmit some or all of the first transport blocks may have a definition same as a definition of a time interval in step 301 and step 302. Details are not described herein again.

Specifically, the start information used to retransmit some or all of the first transport blocks may be that a retransmission preparation is started before scheduling information indicating retransmission is received, or that a retransmission preparation is not started before scheduling information indicating retransmission is received. This is not limited in the present invention.

Specifically, the transmit power control command used to retransmit some or all of the first transport blocks may be a transmit power control command indicating a carrier, or may be a transmit power control command indicating a carrier group. This is not limited in the present invention.

Specifically, the time interval used to retransmit some or all of the first transport blocks may have a definition same as a definition of a time interval in step 301 and step 302. Details are not described herein again.

It should be understood that the first scheduling information may be further used to indicate one piece of one type of information, a plurality of types of information, or a plurality of pieces of same information.

Optionally, the first scheduling information is further used to indicate that the first transport blocks may be retransmitted, or that the first transport blocks may not be retransmitted. In this way, the terminal device determines, based on the first scheduling information, that the first transport blocks may be retransmitted, or that the first transport blocks may not be retransmitted. The first scheduling information may "explicitly" or "implicitly" indicate that the first transport blocks may or may not be retransmitted. This is not limited in this application.

Optionally, the first scheduling information may include first indication information, and the first indication information "implicitly" indicates that the first transport blocks may or may not be retransmitted. Specifically, the first indication information is used to indicate one of at least two modulation and coding scheme (MCS) tables. A first table of the at least two MCS tables is used to indicate that some or all of the first transport blocks may be retransmitted; and a second table of the at least two MCS tables is used to indicate that some or all of the first transport blocks may not be retransmitted. In this way, the terminal device determines, based on the first indication information, that the MCS table is the first table or the second table, so as to determine whether the first transport blocks may or may not be retransmitted. In other words, whether the first transport blocks may or may not be retransmitted is "implicitly" indicated, without introducing an extra indication information field. In this way, information carried in the first scheduling information can be reduced, thereby reducing control signaling overheads on a network, and increasing network transmission efficiency.

For example, the first MCS table may include one or more elements in Table 1 to Table 4. It should be understood that at least one of a modulation order and a transport block size index that correspond to an MCS index #X in the second MCS table is less than a modulation order and a transport block size index that correspond to an MCS index #X in the first MCS table. For example, if a modulation order corresponding to an MCS index #11 in the first MCS table is 4 and a transport block size index is 10, a modulation order corresponding to an MCS index #11 in the second MCS table is 2 and a transport block size index is 10. For another example, if a modulation order corresponding to an MCS index #11 in the first MCS table is 4 and a transport block size index is 10, a modulation order corresponding to an MCS index #11 in the second MCS table is 2 and a transport block size index is 4. For another example, if a modulation order corresponding to an MCS index #11 in the first MCS table is 4 and a transport block size index is 10, a modulation order corresponding to an MCS index #11 in the second MCS table is 4 and a transport block size index is 2.

It should be understood that, for the first MCS table and the second MCS table used in this embodiment of this application, at least one of the modulation order and the transport block size index that correspond to the MCS index #X in the second MCS table is less than the modulation order and the transport block size index that correspond to the MCS index #X in the first MCS table.

TABLE 1

| MCS index $I_{MCS}$ | Modulation order $Q'_m$ | Transport block size index $I_{TBS}$ | Redundancy version rvidx |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | Reserved (reserved) | | 1 |
| 30 | | | 2 |
| 31 | | | 3 |

TABLE 2

| MCS index $I_{MCS}$ | First modulation order $Q_m$ | Second modulation order $Q'_m$ | Transport block size index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A Reserved (reserved) |
| 29 | 2 | 2 | |
| 30 | 4 | 4 | |
| 31 | 6 | 6 | |

TABLE 3

| MCS index $I_{MCS}$ | First modulation order $Q_m$ | Second modulation order $Q'_m$ | Transport block size index $I_{TBS}$ |
|---|---|---|---|
| 0 | 2 | 2 | 0 |
| 1 | 2 | 2 | 2 |
| 2 | 2 | 2 | 4 |
| 3 | 2 | 4 | 6 |
| 4 | 2 | 4 | 8 |
| 5 | 4 | 6 | 10 |
| 6 | 4 | 6 | 11 |
| 7 | 4 | 6 | 12 |
| 8 | 4 | 6 | 13 |
| 9 | 4 | 6 | 14 |
| 10 | 4 | 8 | 15 |
| 11 | 6 | 8 | 16 |
| 12 | 6 | 8 | 17 |
| 13 | 6 | 8 | 18 |
| 14 | 6 | 8 | 19 |
| 15 | 6 | 8 | 20 |
| 16 | 6 | 8 | 21 |
| 17 | 6 | 8 | 22 |
| 18 | 6 | 8 | 23 |
| 19 | 6 | 8 | 24 |
| 20 | 8 | 8 | 25 |
| 21 | 8 | 8 | 27 |
| 22 | 8 | 8 | 28 |
| 23 | 8 | 8 | 29 |
| 24 | 8 | 8 | 30 |
| 25 | 8 | 8 | 31 |
| 26 | 8 | 8 | 32 |
| 27 | 8 | 8 | 33/33A Reserved (reserved) |
| 28 | 2 | 2 | |
| 29 | 4 | 4 | |
| 30 | 6 | 6 | |
| 31 | 8 | 8 | |

TABLE 4

| MCS index $I_{MCS}$ | Modulation order $Q_m$ | Transport block size index $I_{TPS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |

Optionally, the first scheduling information may include second indication information, and the second indication information "explicitly" indicates that the first transport blocks may or may not be retransmitted. Specifically, the second indication information may be at least one bit, a first bit status value of the at least one bit is used to indicate that some or all of the first transport blocks may be retransmitted, and a second bit status value of the at least one bit is used to indicate that some or all of the first transport blocks may not be retransmitted. In other words, whether the first transport blocks may or may not be retransmitted is "explicitly" indicated, and a dedicated indication information field is introduced, so that the network device may flexibly indicate whether some or all of the first transport blocks may be retransmitted.

For example, the second indication information occupies one bit; and if a status value of the bit is 1, it indicates that the first transport blocks may be retransmitted, or if a status value of the bit is 0, it indicates that the first transport blocks may not be retransmitted. Alternatively, a reverse setting may be performed. This is not limited in this application.

It should be understood that the bit occupied by the second indication information may be specially allocated to the second indication information, or may be a reused bit of other information. This is not limited in this application.

Optionally, the first scheduling information may include third indication information, and the third indication information "implicitly" indicates that the first transport blocks may or may not be retransmitted. Specifically, the third indication information is used to indicate one of at least two time intervals, a first time interval of the at least two time intervals is used to indicate that some or all of the first transport blocks may be retransmitted, and a second time interval of the at least two time intervals is used to indicate that some or all of the first transport blocks may not be retransmitted. In other words, whether the first transport blocks may or may not be retransmitted is "implicitly" indicated, thereby reducing power consumption of the network device.

Optionally, the terminal device receives higher layer signaling, the higher layer signaling includes a first threshold, and the terminal device may determine, based on a value relationship between the first threshold and the time interval indicated by the third indication information, the first time interval and/or the second time interval indicated by the third indication information.

Specifically, a time interval that is greater than the first threshold and that is indicated by the third indication information may be set as the first time interval, and a time interval that is less than or equal to the first threshold and that is indicated by the third indication information is set as the second time interval. Alternatively, a reverse setting may be performed. This is not limited in this application.

Optionally, the first threshold may alternatively be preset by the terminal device and the network device, and the first time interval or the second time interval may be determined by the terminal device based on a value relationship between the first threshold and the time interval indicated by the third indication information. This is not limited in this application.

Specifically, the at least two time intervals include at least one of the following time intervals:

a time interval from a time domain resource used to receive the first scheduling information to a first time domain resource included in the first resources, where for example, if the time domain resource for the first scheduling information is a time domain resource #A, and the first time domain resource included in the first resources is a time domain resource #B, the time interval is from the time domain resource #A to the time domain resource #B; assuming that each of time domain resource lengths of the time domain resource #A and the time domain resource #B is a first time length, the time interval is a time period having (B-A) first time lengths; for example, the time interval may be from an end moment of the time domain resource #A to a start moment of the time domain resource #B, or may be from an index of the time domain resource #A to an index of the time domain resource #B;

a time interval from a time domain resource used to receive the first scheduling information to a time domain resource that may be used to receive the second scheduling information, or a time interval from a time domain resource used to receive the first scheduling information to a time domain resource that may be used to receive the third scheduling information, where for example, if the time domain resource for the first scheduling information is a time domain resource #A, and the time domain resource that may be used to receive the second scheduling information is a time domain resource #C, the time interval is from the time domain resource #A to the time domain resource #C; assuming that each of time domain resource lengths of the time domain resource #A and the time domain resource #C is a first time length, the time interval is a time period having (C-A) first time lengths; for example, the time interval may be from an end moment of the time domain resource #A to a start moment of the time domain resource #C, or may be from an index of the time domain resource #A to an index of the time domain resource #C;

a time interval from a time domain resource used to receive the first scheduling information to a time domain resource that may be used to retransmit some or all of the first transport blocks, or a time interval from a time domain resource used to receive the first scheduling information to a time domain resource included in the second resources, or a time interval from a time domain resource used to receive the first scheduling information to a time domain resource included in the third resources, where for example, if the time domain resource for the first scheduling information is a time domain resource #A, and the time domain resource that may be used to retransmit some or all of the first transport blocks is a time domain resource #D, the time interval is from the time domain resource #A to the time domain resource #D; assuming that each of time domain resource lengths of the time domain resource #A and the time domain resource #D is a first time length, the time interval is a time period having (D-A) first time lengths; for example, the time interval may be from an end moment of the time domain resource #A to a start moment of the time domain resource #D, or may be from an index of the time domain resource #A to an index of the time domain resource #D;

a time interval from a first time domain resource included in the first resources to a time domain resource that may be used to retransmit some or all of the first transport blocks, or a time interval from a first time domain resource included in the first resources to a second time resource included in the second resources, where for example, if the first time domain resource included in the first resources is a time domain resource #B, and the time domain resource that may be used to retransmit some or all of the first transport blocks is a time domain resource #D, the time interval is from the time domain resource #B to the time domain resource #D; assuming that each of time domain resource lengths of the time domain resource #B and the time domain resource #D is a first time length, the time interval is a time period having (D-B) first time lengths; for example, the time interval may be from an end moment of the time domain resource #B to a start moment of the time domain resource #D, or may be from an index of the time domain resource #B to an index of the time domain resource #D;

a time interval from a first time domain resource included in the first resources to a time domain resource that may be used to receive the second scheduling information, or a time interval from a first time domain resource included in the first resources to a time domain resource that may be used to receive the third scheduling information, where for example, if the first time domain resource included in the first resources is a time domain resource #B, and the time domain resource that may be used to receive the second scheduling information is a time domain resource #C, the time interval is from the time domain resource #B to the time domain resource #C; assuming that each of time domain resource lengths of the time domain resource #B and the time domain resource #C is a first time length, the time interval is a time period having (C-B) first time lengths; for example, the time interval may be from an end moment of the time domain resource #B to a start moment of the time domain resource #C, or may be from an index of the time domain resource #B to an index of the time domain resource #C; and a time interval from a time domain resource used to receive the second scheduling information to a time domain resource that may be used to retransmit some or all of the first transport blocks, or a time interval from a time domain resource used to receive the second scheduling information to a time domain resource included in the second resources, or a time interval from a time domain resource used to receive the third scheduling information to a time domain resource that may be used to retransmit some or all of the first transport blocks, or a time interval from a time domain resource used to receive the third scheduling information to a time domain resource included in the third resources, where for example, if the time domain resource used to receive the second scheduling information is a time domain resource #C, and the time domain resource that may be used to retransmit some or all of the first transport blocks is a time domain resource #D, the time interval is from the time domain resource #C to the time domain resource #D; assuming that each of time domain resource lengths of the time domain resource #C and the time domain resource #D is a first time length, the time interval is a time period having (D-C) first time lengths; for example, the time interval may be from an end moment of the time domain resource #C to a start moment of the time domain resource #C, or may be from an index of the time domain resource #C to an index of the time domain resource #D.

The time domain resource that may be used to receive the second scheduling information, the time domain resource that may be used to receive the third scheduling information, and the time domain resource that may be used to retransmit some or all of the first transport blocks may be a time domain resource configured by using the higher layer signaling or may be predefined.

Specifically, the time interval of the at least two time intervals may alternatively be a time interval between any two of the first time domain resource, the second time domain resource, the third time domain resource, a fourth time domain resource, and a fifth time domain resource. The first time domain resource is a time domain resource included in the first resources, the second time domain resource is a time domain resource included in the second resources, the third time domain resource is a time domain resource included in the third resources, the fourth time domain resource is a time domain resource used by the terminal device to receive the first scheduling information, and the fifth time domain resource is a time domain resource used by the terminal device to receive the second scheduling information or the third scheduling information. In addition, the time interval between the two time domain resources is from an end moment of an early time domain resource to a start moment of a later time domain resource. For example, a time interval between the fourth time domain resource and the fifth time domain resource is from an end moment of the fourth time domain resource to a start moment of the fifth time domain resource. The fourth time domain resource used to receive the first scheduling information is earlier than the fifth time domain resource used to receive the second scheduling information. In this way, the terminal device can determine, based on a length of the time interval, that the first transport blocks may or may not be retransmitted.

Optionally, the first scheduling information includes fourth indication information, the fourth indication information is used to indicate one of at least two modulation and coding scheme MCS values, a first MCS value of the at least two MCS values is used to indicate that some or all of the first transport blocks may be retransmitted, and a second MCS value of the at least two MCS values is used to indicate that some or all of the first transport blocks may not be retransmitted.

The terminal device determines, based on the fourth indication information, whether the MCS value is the first MCS value or the second MCS value, so as to determine whether some or all of the first transport blocks may or may not be retransmitted. Whether some or all of the first transport blocks may or may not be retransmitted is "implicitly" indicated, without introducing an extra indication information field. In this way, information carried in the first scheduling information can be reduced, thereby reducing control signaling overheads on a network, and increasing network transmission efficiency.

Optionally, if the terminal device determines, based on the first scheduling information, that the first transport blocks may be retransmitted, the terminal device performs the preparation operation. In this way, the terminal device may retransmit the first transport blocks within a relatively short time period, thereby reducing a delay for retransmitting the first transport blocks.

It should be noted that, if the terminal device determines, based on the first scheduling information, that the first transport blocks may not be retransmitted, the terminal device does not need to perform the preparation operation.

It should be understood that the first scheduling information may further indicate a quantity of times that the first transport blocks may be retransmitted. In other words, the terminal device may perform the preparation operation for the first transport blocks in advance a plurality of times. This is not limited in this application.

Optionally, in an embodiment, if the first scheduling information may indicate the third time domain resource used to retransmit the first transport blocks, when a time period between a current moment and the third time domain resource reaches a second threshold, the terminal device may initiate the preparation operation for retransmitting the first transport blocks. In this way, impact of excessively late initiation on retransmitting the first transport blocks can be avoided, and excessively early initiation of the preparation operation may also be avoided, thereby reducing power consumption of the terminal device.

It should be noted that the second threshold may be determined based on a time period required by the terminal device to complete the preparation operation for retransmitting the first transport blocks, may be notified by using the higher layer signaling, or may be predefined. For example, the second threshold is one or more subframes, one or more slots, one or more symbols, or one or more time domain resources. This is not limited in the present invention.

Specifically, a time domain resource may be further a unit that has an interval of n time resources to current scheduling information or uplink transmission. A frequency domain resource may be further one of resource allocation, resource allocation type, and a subcarrier spacing. Modulation and coding may be specifically one of a modulation and coding table, a modulation scheme, a coding scheme, a code rate, and a modulation and coding index value. The code rate may be ½, ⅓, ⅙, or the like. The reference signal information may include a cyclic shift, a location, a structure, and the like.

It should be understood that a manner of retransmitting the first transport blocks may be the same as or different from a manner of initially transmitting the first transport blocks. When some or all of the first transport blocks are retransmitted, a same manner or different manners may be used. This is not limited in this embodiment of this application. A transmission manner may be at least one of modulation, coding, a transmission mode, a transmission standard (OFDM or IFDMA), and a frequency domain resource.

Therefore, in the data sending method in this embodiment of this application, the first scheduling information used to indicate the first resources used to send the first transport blocks and to indicate that some or all of the first transport blocks may or may not be retransmitted is received, and the first transport blocks are sent on the first resources based on the first scheduling information. In this way, the terminal device may determine, in advance based on whether some or all of the first transport blocks may or may not be retransmitted, whether the preparation operation needs to be performed for retransmitting the first transport blocks, and then perform the preparation operation in advance after determining that the first transport blocks may be retransmitted, before the terminal device receives the second scheduling information or the third scheduling information used to instruct the terminal device to retransmit some or all of the first transport blocks. Therefore, a time period for retransmitting the first transport blocks is reduced.

Figure 4:
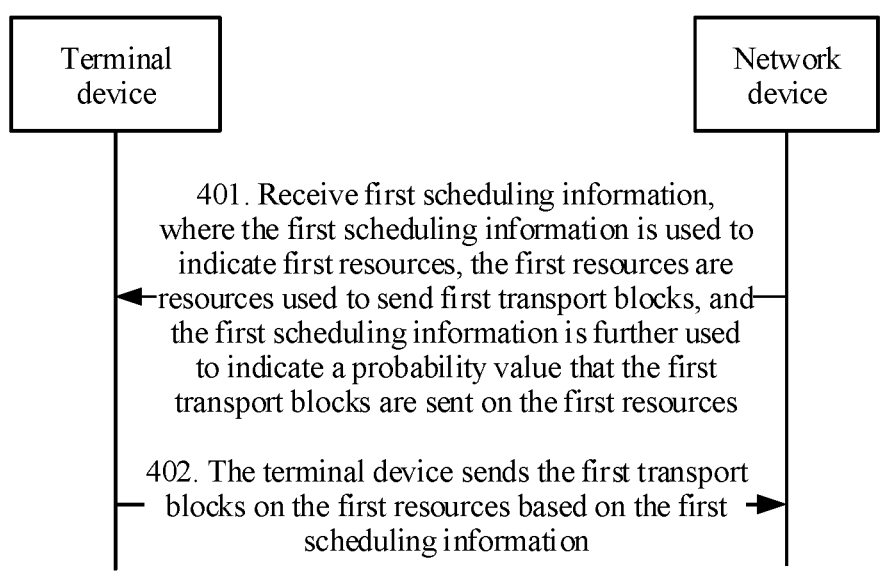
FIG. 4 is a schematic flowchart of a data sending method according to another embodiment of this application.

FIG. 4 is a schematic flowchart of a data sending method according to another embodiment of this application. Meanings of terms in this embodiment are the same as the meanings of the terms in the foregoing embodiments. As shown in FIG. 4, the method includes the following steps:

401: A terminal device receives first scheduling information, where the first scheduling information is used to indicate first resources, the first resources are resources used to send first transport blocks, the first scheduling information is further used to indicate a probability value, and the probability value is a block error rate for the first transport blocks that are received by a network device on the first resources or a probability that a network device successfully receives the first transport blocks on the first resources. Correspondingly, the network device sends the first scheduling information.

402: The terminal device sends the first transport blocks on the first resources based on the first scheduling information.

The terminal device receives the first scheduling information used to indicate the first resources used to send the first transport blocks, the first scheduling information is further used to indicate the probability value, the probability value may be the block error rate that is of the received first transport blocks and that is predicted by the network device based on channel quality of the terminal device and/or a modulation and coding scheme or a probability that the first transport blocks are successfully received and that is predicted by the network device based on channel quality of the terminal device and/or a modulation and coding scheme. In this way, the terminal device may determine, based on the probability value, whether a preparation operation needs to be performed for retransmitting all or some of the first transport blocks, so that a time period for retransmitting some or all of the first transport blocks can be shortened, thereby reducing a transmission delay.

The terminal device sends the first transport blocks on the first resources indicated by the first scheduling information. Correspondingly, the network device receives the first transport blocks on the first resources.

As should be understood, that the first scheduling information is further used to indicate the probability value may be that the first scheduling information is further used to indicate the probability value of the first transport blocks, or may be that the first scheduling information is further used to indicate the probability value of the first transport blocks sent on the first resources.

It should be understood that the block error rate may be specifically a probability that the network device incorrectly demodulates a first transport block. The block error rate may be a BLER (e.g., a Block Error Rate) or an rBLER (e.g., a residual Block Error Rate). This is not limited in the present invention.

For example, the probability value may be the block error rate for the first transport blocks, and the block error rate is a rational number greater than 0, such as 0.1, 0.01, 0.001, 0.0001, 0.00001, 0.000001, 0.0000001, 0.00000001, 0.000000001, 0.0000000001, 0.02, 0.04, 0.05, 0.002, or 0.0025. The probability value may be the probability that the first transport blocks are successfully received. The probability that the first transport blocks are successfully received is a rational number greater than 0, and may be specifically 1—BLER or a 1—rBLER, such as 0.9, 0.99, 0.99999, or 0.999999999.

It should be further understood that there may be one or more first transport blocks.

Optionally, in an embodiment, the probability value may be a first probability value or a second probability value, the first probability value indicates that all or some of the first transport blocks are retransmitted, and the second probability value indicates that all or some of the first transport blocks are not retransmitted.

Specifically, whether the probability value is the first probability value or the second probability value may be determined by the terminal device or the network device.

For example, the network device may set a first threshold value. When the network device predicts that the probability that the first transport blocks are successfully received is less than the first threshold value, it is considered that a demodulation error probability is high, and the terminal device may be instructed to retransmit all or some of the first transport blocks; in other words, the probability value is expressed as the first probability value. When the network device predicts that the probability that the first transport blocks are successfully received is greater than the first threshold value, it is considered that a demodulation error probability is low, and the terminal device may be instructed to retransmit all or some of the first transport blocks; in other words, the probability value is expressed as the second probability value. In contrast, the network device may set a second threshold value. If the network device predicts that the block error rate for the first transport blocks that are received is greater than the second threshold value, it is considered that a demodulation error probability is high, and the terminal device may be instructed to retransmit all or some of the first transport blocks; in other words, the probability value is expressed as the first probability value. When the network device predicts that the probability that the first transport blocks are successfully received is less than the second threshold value, it is considered that a demodulation error probability is low, and the terminal device may be instructed to retransmit all or some of the first transport blocks; in other words, the probability value is expressed as the second probability value.

It should be understood that the first threshold value and the second threshold value may be the same or different. The first threshold value is a rational number greater than 0, such as 0.99999, 0.99, or 0.999. This is not limited in the present invention. The second threshold value is a rational number greater than 0, such as 0.00001, 0.01, or 0.001. This is not limited in the present invention. Alternatively, the first threshold value and the second threshold value may be predefined, or may be set by the network device and notified to the terminal device by using higher layer signaling.

It should be noted that, if the first probability value indicates that some of the first transport blocks are retransmitted, the first scheduling information may further indicate specific locations of the some to-be-retransmitted first transport blocks in the first transport blocks; or the terminal device and the network device may agree in advance on specific locations of the some to-be-retransmitted first transport blocks. This is not limited in this application. In addition, for ease of description, unless otherwise stated, retransmitting first transport blocks in the following embodiments may be retransmitting all of the first transport blocks or retransmitting some of the first transport blocks.

It should be understood that some of the first transport blocks may be at least one code block or at least one code block group. This is not limited in this application. If the terminal device determines to retransmit some of the first transport blocks, sizes of the to-be-retransmitted transport blocks are reduced when compared with those in a conventional solution, thereby increasing network resource utilization.

Optionally, in another embodiment, the probability value may be further a first probability value or a second probability value, the first probability value indicates that all or some of the first transport blocks may be retransmitted, and the second probability value indicates that all or some of the first transport blocks may not be retransmitted.

Specifically, a method for determining whether the probability value is the first probability value or the second probability value may be the same as that in the foregoing embodiment. To avoid repetition, details are not described herein again.

Optionally, when the terminal device determines that the probability value further indicated by the first scheduling information is the first probability value, the terminal device performs the preparation operation for retransmitting all or some of the first transport blocks.

Specifically, when the terminal device determines that the first scheduling information is used to indicate the first probability value, in other words, the first scheduling information is used to indicate that the terminal device retransmits all or some of the first transport blocks, or is used to indicate that the terminal device may retransmit all or some of the first transport blocks, the terminal device performs the preparation operation for retransmitting all or some of the first transport block, so that a time period for retransmitting some or all of the first transport blocks can be reduced, thereby reducing a retransmission delay.

It should be understood that the terminal device performs the preparation operation for retransmitting the first transport blocks, and the preparation operation includes at least one of the following: coding processing, configuring higher layer configuration information, and receiving the higher layer configuration information. For the coding processing, the terminal device may encode at least one code block at a preset code rate by using a coding scheme of a Turbo parallel concatenated convolutional code (PCCC), a low-density parity-check code (LDPC), a convolutional code (CC), a tail biting convolutional code (TBCC), or a polar code, or may perform one or a combination of the following processing: scrambling, modulation, layer mapping, and precoding after encoding at least one code block at a preset code rate by using a coding scheme of Turbo, a PCCC, an LDPC, a CC, or a TBCC.

It should be further understood that, for ease of description, initially transmitting the first transport blocks may be expressed as "initial transmission" or "transmission", and transmitting some or all of the first transport blocks again may be expressed as "retransmission".

It should be further understood that a first transport block is a basic unit carrying at least data information and/or control information, and the data information and/or the control information may be included in one transport block (or a plurality of transport blocks). Any transport block meeting the feature may be used as the first transport block. The first transport block is not limited in this application. The control information may be uplink control information (UCI), and the uplink control information may include at least one of the following: channel state information (CSI), a hybrid automatic repeat request (HARD), a rank indicator (RI), a precoding matrix indicator (PMI), a channel quality indicator (CQI), and the like.

Optionally, when the probability value indicated by the first scheduling information received by the terminal device is the second probability value, if the first probability value is relatively large, but does not exceed the first threshold value, and the terminal device has relatively sufficient resources, the terminal device may still perform the preparation operation for retransmitting the first transport blocks.

Optionally, the terminal device may further receive second scheduling information, the second scheduling information is used to instruct the terminal device to retransmit the first transport blocks, the second scheduling information is used to indicate second resources, and the second resources are resources used to retransmit the first transport blocks. In this way, the terminal device may retransmit the first transport blocks on the second resources based on the second scheduling information. When the terminal device already learns that the first transport blocks need to be retransmitted, the terminal device may perform the preparation operation before receiving the second scheduling information. Therefore, a time domain resource included in the second resources is usually earlier than a time domain resource that is determined based on the conventional solution and that is used to retransmit the first transport blocks. A time period for retransmitting the first transport blocks is reduced when compared with that in the conventional solution.

It should be understood that the second resources include a second time domain resource and/or a second frequency domain resource.

Optionally, the terminal device receives third scheduling information sent by the network device, the third scheduling information is used to instruct the terminal device to retransmit the first transport blocks, the terminal device receives the third scheduling information and/or the first scheduling information, and determines third resources, and the terminal device retransmits the first transport blocks on the third resources.

It should be understood that the third resources may include a third time domain resource and/or a third frequency domain resource.

It should be further understood that the third time domain resource included in the third resources may be the same as or different from the second time domain resource included in the second resources. This is not limited in this application.

Optionally, the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a transmit power control command used to retransmit some or all of the first transport blocks. Indication information related to the retransmission of the first transport blocks is at least one of the foregoing information.

Optionally, the first scheduling information includes first indication information, the first indication information is used to indicate one of at least two modulation and coding scheme MCS tables, a first table of the at least two MCS tables is used to indicate the first probability value, and a second table of the at least two MCS tables is used to indicate the second probability value.

Optionally, the first scheduling information includes second indication information, the second indication information is at least one bit, a first bit status value of the at least one bit is used to indicate the first probability value, and a second bit status value of the at least one bit is used to indicate the second probability value.

Optionally, the first scheduling information includes third indication information, the third indication information is used to indicate one of at least two time intervals, a first time interval of the at least two time intervals is used to indicate the first probability value, and a second time interval of the at least two time intervals is used to indicate the second probability value.

Specifically, the time interval may have a definition same as a definition of a time interval in step 301 and step 302, or may have another definition. This is not limited in this application.

Optionally, the method further includes: receiving, by the terminal device, higher layer signaling, where the higher layer signaling includes a first threshold; and determining, by the terminal device, the first time interval and/or the second time interval based on the first threshold.

The first threshold may be predefined, or may be notified by using the higher layer signaling. For example, the first threshold is one or more subframes, one or more slots, one or more symbols, or one or more time domain resources. This is not limited in the present invention.

Optionally, the method further includes: performing, by the terminal device, a preparation operation for retransmitting all or some of the first transport blocks, where the terminal device determines the first probability value.

It should be understood that, in this embodiment of this application, related features, functions, and the like of the terminal device and the network device and interaction between the terminal device and the network device correspond to the descriptions in the embodiment in FIG. 3. For brevity, details are not described herein again.

Therefore, in the data sending method in this embodiment of this application, the first scheduling information used to indicate the first resources used to send the first transport blocks and to indicate the probability value that the terminal device sends the first transport blocks is received, and the first transport blocks are sent on the first resources based on the first scheduling information. In this way, the terminal device may determine, based on the probability value, whether all or some of the first transport blocks need to be retransmitted, and perform the preparation operation when the terminal device determines that the first transport blocks need to be retransmitted, so that a time period for retransmitting some or all of the first transport blocks can be shortened, thereby reducing a transmission delay.

Figure 5:
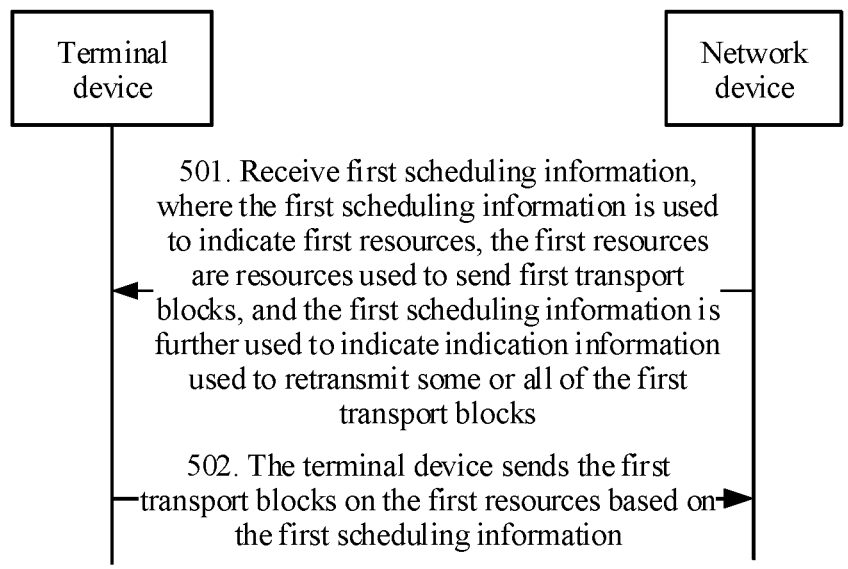
FIG. 5 is a schematic flowchart of a data sending method according to another embodiment of this application.

FIG. 5 is a schematic flowchart of a data sending method according to an embodiment of this application. As shown in FIG. 5, the method includes the following steps:

501: A terminal device receives first scheduling information, where the first scheduling information is used to indicate first resources, the first resources are resources used to send first transport blocks, and the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a transmit power control command used to retransmit some or all of the first transport blocks.

502: The terminal device sends the first transport blocks on the first resources based on the first scheduling information.

Specifically, the terminal device receives the first scheduling information, and the first scheduling information is used to indicate the first resources used to send the first transport blocks, so that the terminal device may transmit the first transport blocks on the first resources. The first resources include a first time domain resource and/or a first frequency domain resource. In addition, the first scheduling information is further used to indicate that indication information related to the retransmission of the first transport blocks is at least one of the foregoing information, and the indication information is indicated to the terminal device by using the first scheduling information. If the terminal device determines, based on the first scheduling information, that the indication information related to the retransmission of the first transport blocks is at least one of the foregoing information, before the terminal device receives second scheduling information or third scheduling information used to instruct the terminal device to retransmit some or all of the first transport blocks, the terminal device may determine, based on the indication information, whether a preparation operation needs to be performed for retransmitting some or all of the first transport blocks, so that a time period for retransmitting some or all of the first transport blocks can be shortened. In other words, in this embodiment of this application, a time period from the second scheduling information or the third scheduling information to retransmitting some or all of the first transport blocks is shorter than a time period from the first scheduling information to transmitting the first transport blocks, thereby reducing a retransmission delay.

Specifically, the modulation scheme used to retransmit some or all of the first transport blocks may be quadrature phase shift keying (QPSK), 16 quadrature amplitude modulation (QAM), 64 QAM, 256 QAM, 512 QAM, or 1024 QAM. This is not limited in the present invention.

Specifically, the time-frequency domain resource used to retransmit some or all of the first transport blocks may be one or more time domain resources and/or one or more frequency domain resources. This is not limited in the present invention.

Specifically, the coding scheme used to retransmit some or all of the first transport blocks may be Turbo, a PCCC, an LDPC, a CC, a TBCC, or polar. This is not limited in the present invention.

Specifically, the reference signal information used to retransmit some or all of the first transport blocks may be sending location information of a reference signal, a sequence of the reference signal, and/or a comb structure of the reference signal. This is not limited in the present invention.

Specifically, the redundancy version used to retransmit some or all of the first transport blocks may be 0, 1, 2, or 3. This is not limited in the present invention.

Specifically, the code rate used to retransmit some or all of the first transport blocks may be any positive number greater than 0. This is not limited in the present invention.

Specifically, the antenna port used to retransmit some or all of the first transport blocks may be any antenna port number. This is not limited in the present invention.

Specifically, the precoding matrix indication information used to retransmit some or all of the first transport blocks may be precoding indications of one or more beams. This is not limited in the present invention.

Specifically, the carrier indication information used to retransmit some or all of the first transport blocks may be a carrier index number or a carrier group index number. This is not limited in the present invention.

Specifically, the start information used to retransmit some or all of the first transport blocks may be that a retransmission preparation is started before scheduling information indicating retransmission is received, or that a retransmission preparation is not started before scheduling information indicating retransmission is received. This is not limited in the present invention.

Specifically, the retransmission transmit power control command used to retransmit some or all of the first transport blocks may be a transmit power control command indicating a carrier, or may be a transmit power control command indicating a carrier group. This is not limited in the present invention.

Specifically, the time interval used to retransmit some or all of the first transport blocks may have a definition same as a definition of a time interval in step 301 and step 302. Details are not described herein again.

It should be understood that the first scheduling information may be further used to indicate one piece of one type of information, a plurality of types of information, or a plurality of pieces of same information.

It should be noted that there may be one or more first transport blocks.

It should be noted that the terminal device determines, based on at least one of higher layer signaling, the first scheduling information, the second scheduling information, and the third scheduling information, to retransmit some of the first transport blocks or all of the first transport blocks. The terminal device may determine to retransmit some of the first transport blocks or all of the first transport blocks. Some of the first transport blocks may be at least one code block or at least one code block group. This is not limited in this application. If the terminal device determines to retransmit some of the first transport blocks, sizes of the to-be-retransmitted transport blocks are reduced when compared with those in a conventional solution, thereby increasing network resource utilization.

It should be noted that, if the first scheduling information received by the terminal device indicates that some of the first transport blocks may be retransmitted, the scheduling information may further indicate specific locations of the some to-be-retransmitted first transport blocks in the first transport blocks; or the terminal device and a network device may agree in advance on specific locations of the some to-be-retransmitted first transport blocks. This is not limited in this application. In addition, for ease of description, unless otherwise stated, retransmitting first transport blocks in the following embodiments may be retransmitting all of the first transport blocks or retransmitting some of the first transport blocks.

It should be understood that the terminal device performs the preparation operation for retransmitting the first transport blocks, and the preparation operation includes at least one of the following: coding processing, configuring higher layer configuration information, and receiving the higher layer configuration information. For the coding processing, the terminal device may encode at least one code block at a preset code rate by using a coding scheme of a Turbo parallel concatenated convolutional code (PCCC), a low-density parity-check code (LDPC), a convolutional code (CC), a tail biting convolutional code (TBCC), or a polar code, or may perform one or a combination of the following processing: scrambling, modulation, layer mapping, and precoding after encoding at least one code block at a preset code rate by using a coding scheme of Turbo, a PCCC, an LDPC, a CC, or a TBCC.

It should be further understood that, for ease of description, initially transmitting the first transport blocks may be expressed as "initial transmission" or "transmission", and transmitting some or all of the first transport blocks again may be expressed as "retransmission".

It should be further understood that a first transport block is a basic data unit carrying at least data information, and the data information may be included in a data transport block (or a plurality of transport blocks). Any transport block meeting the feature may be used as the first transport block. The first transport block is not limited in this application. The control information may be uplink control information (UCI), and the uplink control information may include at least one of the following: channel state information (CSI), a hybrid automatic repeat request (HARM), a rank indicator (RI), a precoding matrix indicator (PMI), a channel quality indicator (CQI), and the like.

Therefore, in the data sending method in this embodiment of this application, the first scheduling information used to indicate the first resources used to send the first transport blocks and to indicate the indication information used to indicate that some or all of the first transport blocks are retransmitted is received, and the first transport blocks are sent on the first resources based on the first scheduling information. In this way, the terminal device may determine, based on the indication information, whether the preparation operation needs to be performed for retransmitting the first transport blocks, and then perform the preparation operation in advance before the terminal device receives the second scheduling information or the third scheduling information used to instruct the terminal device to retransmit some or all of the first transport blocks. In this way, a time period for retransmitting the first transport blocks is reduced.

Optionally, the terminal device may further receive second scheduling information, the second scheduling information is used to instruct the terminal device to retransmit the first transport blocks, the second scheduling information is used to indicate second resources, and the second resources are resources used to retransmit the first transport blocks. In this way, the terminal device may retransmit the first transport blocks on the second resources based on the second scheduling information. When the terminal device already learns that the first transport blocks may be retransmitted, the terminal device may perform the preparation operation before receiving the second scheduling information. Therefore, a time domain resource included in the second resources is usually earlier than a time domain resource that is determined based on the conventional solution and that is used to retransmit the first transport blocks. A time period for retransmitting the first transport blocks is reduced when compared with that in the conventional solution.

It should be understood that the second resources include a second time domain resource and/or a second frequency domain resource.

Optionally, the network device may predict that the first transport blocks may or may not be retransmitted. The network device indicates the indication information related to the retransmission of the first transport blocks to the terminal device by using the first scheduling information.

Optionally, the terminal device receives third scheduling information, the third scheduling information is used to instruct the terminal device to retransmit the first transport blocks, the terminal device receives the third scheduling information and/or the first scheduling information, and determines third resources, and the terminal device retransmits the first transport blocks on the third resources.

It should be understood that the third resources may include a third time domain resource and/or a third frequency domain resource.

It should be further understood that the third time domain resource included in the third resources may be the same as or different from the second time domain resource included in the second resources. This is not limited in this application.

Optionally, the first scheduling information is further used to indicate that the first transport blocks may be retransmitted, or that the first transport blocks may not be retransmitted. In this way, the terminal device determines, based on the first scheduling information, that the first transport blocks may be retransmitted, or that the first transport blocks may not be retransmitted. The first scheduling information may "explicitly" or "implicitly" indicate that the first transport blocks may or may not be retransmitted. This is not limited in this application.

It should be understood that, in this embodiment of this application, related features, functions, and the like of the terminal device and the network device and interaction between the terminal device and the network device correspond to the descriptions in the embodiments in FIG. 3 and FIG. 4. For brevity, details are not described herein again.

Figure 6:
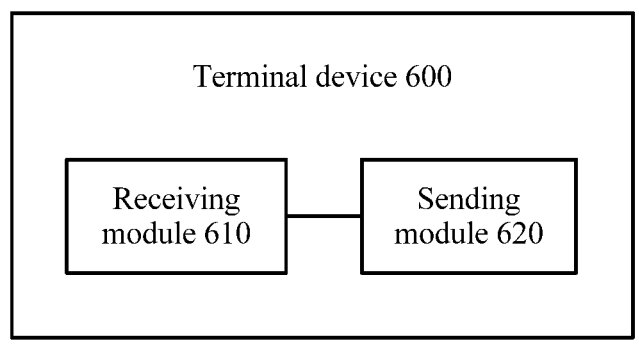
FIG. 6 is a schematic block diagram of a terminal device according to an embodiment of this application.

FIG. 6 is a schematic block diagram of a terminal device 600 according to an embodiment of this application. As shown in FIG. 6, the terminal device 600 includes:

a receiving module 610: configured to receive first scheduling information, where the first scheduling information is used to indicate first resources, the first resources are resources used to send first transport blocks, and the first scheduling information is further used to indicate that some or all of the first transport blocks may be retransmitted, or that some or all of the first transport blocks may not be retransmitted; and a sending module 620: configured to send the first transport blocks on the first resources based on the first scheduling information.

Therefore, the terminal device in this embodiment of this application receives the first scheduling information used to indicate the first resources used to send the first transport blocks and to indicate that some or all of the first transport blocks may or may not be retransmitted, and sends the first transport blocks on the first resources based on the first scheduling information. In this way, the terminal device may determine, in advance based on whether some or all of the first transport blocks may or may not be retransmitted, whether a preparation operation needs to be performed for retransmitting the first transport blocks, and then perform the preparation operation in advance when determining that the first transport blocks may be retransmitted. In this way, a time period for retransmitting some or all of the first transport blocks is reduced.

Optionally, the first scheduling information includes first indication information, the first indication information is used to indicate one of at least two modulation and coding scheme MCS tables, a first table of the at least two MCS tables is used to indicate that some or all of the first transport blocks may be retransmitted, and a second table of the at least two MCS tables is used to indicate that some or all of the first transport blocks may not be retransmitted.

Optionally, the first scheduling information includes second indication information, the second indication information is at least one bit, a first bit status value of the at least one bit is used to indicate that some or all of the first transport blocks may be retransmitted, and a second bit status value of the at least one bit is used to indicate that some or all of the first transport blocks may not be retransmitted.

Optionally, the first scheduling information includes third indication information, the third indication information is used to indicate one of at least two time intervals, a first time interval of the at least two time intervals is used to indicate that some or all of the first transport blocks may be retransmitted, and a second time interval of the at least two time intervals is used to indicate that some or all of the first transport blocks may not be retransmitted.

Optionally, the receiving module 610 is further configured to receive higher layer signaling, where the higher layer signaling includes a first threshold.

The terminal device further includes:

a processing module, configured to determine the first time interval and/or the second time interval based on the first threshold.

Optionally, the processing module is further configured to determine, based on the first scheduling information, that some or all of the first transport blocks may be retransmitted, or that some or all of the first transport blocks may not be retransmitted.

Optionally, the processing module is further configured to perform the preparation operation for retransmitting all or some of the first transport blocks, and the terminal device determines that some or all of the first transport blocks may be retransmitted.

Optionally, the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a transmit power control command used to retransmit some or all of the first transport blocks.

Optionally, the receiving module 610 is further configured to receive second scheduling information, where the second scheduling information is used to instruct the terminal device to retransmit some or all of the first transport blocks on second resources; and the sending module 620 is further configured to retransmit some or all of the first transport blocks on the second resources based on the second scheduling information.

Optionally, the receiving module 610 is further configured to receive third scheduling information, where the third scheduling information is used to instruct the terminal device to retransmit some or all of the first transport blocks; and the sending module 620 is further configured to retransmit some or all of the first transport blocks on third resources based on the third scheduling information and the first scheduling information.

Therefore, the terminal device in this embodiment of this application receives the first scheduling information used to indicate the first resources used to send the first transport blocks and to indicate that some or all of the first transport blocks may or may not be retransmitted, and sends the first transport blocks on the first resources based on the first scheduling information. In this way, the terminal device may determine, in advance based on whether some or all of the first transport blocks may or may not be retransmitted, whether the preparation operation needs to be performed for retransmitting the first transport blocks, and then perform the preparation operation in advance when determining that the first transport blocks may be retransmitted. In this way, a time period for retransmitting some or all of the first transport blocks is reduced.

It should be understood that the terminal device 600 in this embodiment of this application may correspond to the terminal device in the data sending method 300 in the embodiment of this application, and the foregoing and other management operations and/or functions of the modules in the terminal device 600 are separately intended for implementing corresponding steps in the foregoing methods. For brevity, details are not described herein again.

Figure 7:
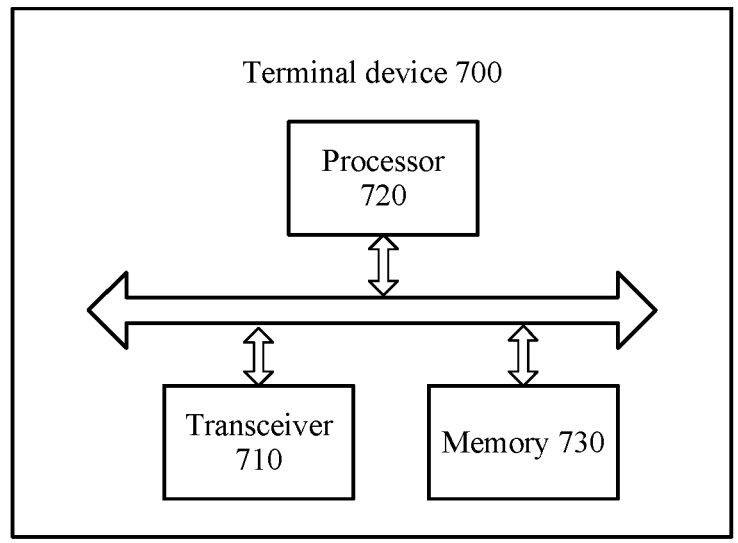
FIG. 7 is a schematic structural diagram of a terminal device according to an embodiment of this application.

The receiving module 610 and the sending module 620 in this embodiment of this application may be implemented by a transceiver. As shown in FIG. 7, a terminal device 700 may include a transceiver 710, a processor 720, and a memory 730. The memory 730 may be configured to store indication information, and may be further configured to store code, an instruction, and the like that are executed by the processor 720.

Figure 8:
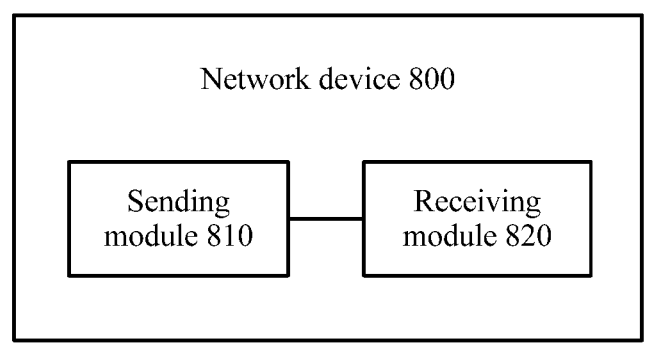
FIG. 8 is a schematic block diagram of a network device according to an embodiment of this application.

FIG. 8 is a schematic block diagram of a network device 800 according to an embodiment of this application. As shown in FIG. 8, the network device 800 includes:

a sending module 810, configured to send first scheduling information, where the first scheduling information is used to indicate first resources, the first resources are resources used to send first transport blocks, and the first scheduling information is further used to indicate that some or all of the first transport blocks may be retransmitted, or that some or all of the first transport blocks may not be retransmitted; and a receiving module 820, configured to receive the first transport blocks on the first resources.

Therefore, the network device in this embodiment of this application sends the first scheduling information used to indicate the first resources used to send the first transport blocks and to indicate that some or all of the first transport blocks may or may not be retransmitted, and sends the first transport blocks on the first resources based on the first scheduling information. In this way, the terminal device may determine, in advance based on whether some or all of the first transport blocks may or may not be retransmitted, whether a preparation operation needs to be performed for retransmitting the first transport blocks, and then perform the preparation operation in advance when determining that the first transport blocks may be retransmitted. In this way, a time period for retransmitting some or all of the first transport blocks is reduced.

Optionally, the first scheduling information includes first indication information, the first indication information is used to indicate one of at least two modulation and coding scheme MCS tables, a first table of the at least two MCS tables is used to indicate that some or all of the first transport blocks may be retransmitted, and a second table of the at least two MCS tables is used to indicate that some or all of the first transport blocks may not be retransmitted.

Optionally, the first scheduling information includes second indication information, the second indication information is at least one bit, a first bit status value of the at least one bit is used to indicate that some or all of the first transport blocks may be retransmitted, and a second bit status value of the at least one bit is used to indicate that some or all of the first transport blocks may not be retransmitted.

Optionally, the first scheduling information includes third indication information, the third indication information is used to indicate one of at least two time intervals, a first time interval of the at least two time intervals is used to indicate that some or all of the first transport blocks may be retransmitted, and a second time interval of the at least two time intervals is used to indicate that some or all of the first transport blocks may not be retransmitted.

Optionally, the sending module 810 is further configured to send higher layer signaling, where the higher layer signaling includes a first threshold, and the first threshold is used by the terminal device to determine the first time interval and/or the second time interval.

Optionally, the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a transmit power control command used to retransmit some or all of the first transport blocks.

Optionally, the sending module 810 is further configured to send second scheduling information, where the second scheduling information is used to instruct the terminal device to retransmit some or all of the first transport blocks on second resources; and the receiving module 820 is further configured to receive some or all of the first transport blocks on the second resources.

Optionally, the sending module 810 is further configured to send third scheduling information, where the third scheduling information is used to instruct the terminal device to retransmit some or all of the first transport blocks; and the receiving module 820 is further configured to receive some or all of the first transport blocks on third resources.

Therefore, the network device in this embodiment of this application sends the first scheduling information used to indicate the first resources used to send the first transport blocks and to indicate that some or all of the first transport blocks may or may not be retransmitted, and sends the first transport blocks on the first resources based on the first scheduling information. In this way, the terminal device may determine, in advance based on whether some or all of the first transport blocks may or may not be retransmitted, whether the preparation operation needs to be performed for retransmitting the first transport blocks, and then perform the preparation operation in advance when determining that the first transport blocks may be retransmitted. In this way, a time period for retransmitting some or all of the first transport blocks is reduced.

It should be understood that the network device 800 in this embodiment of this application may correspond to the execution body of the data sending method 300 in the embodiment of this application, and the foregoing and other management operations and/or functions of the modules in the network device 800 are separately intended for implementing corresponding steps in the foregoing methods. For brevity, details are not described herein again.

Figure 9:
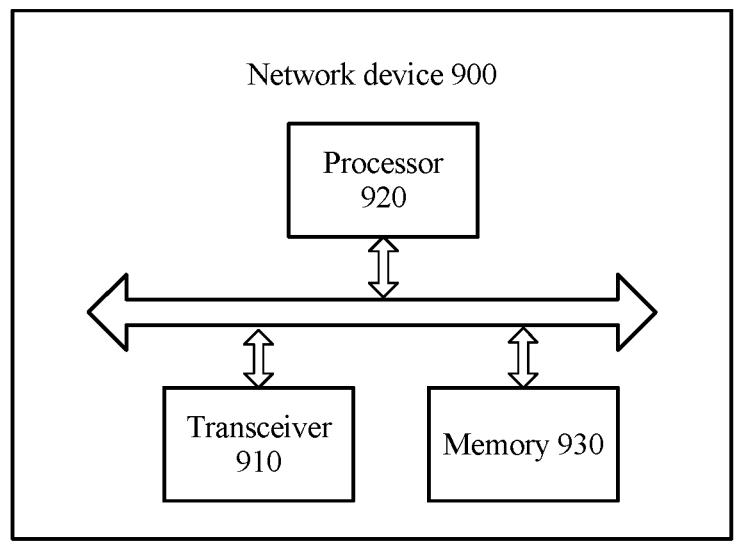
FIG. 9 is a schematic structural diagram of a network device according to an embodiment of this application.

The sending module 810 and the receiving module 820 in this embodiment of this application may be implemented by a transceiver. As shown in FIG. 9, a network device 900 may include a transceiver 910, a processor 920, and a memory 930. The memory 930 may be configured to store indication information, and may be further configured to store code, an instruction, and the like that are executed by the processor 920.

Figure 10:
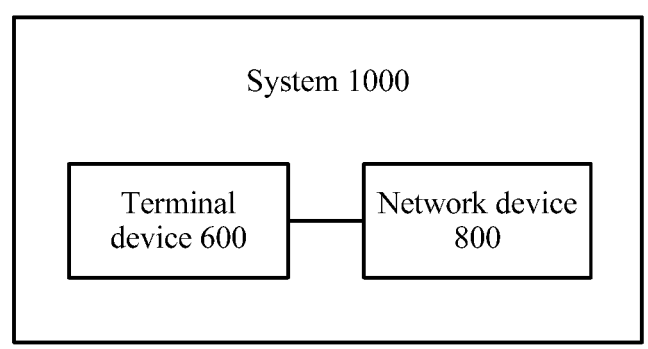
FIG. 10 is a schematic block diagram of a system according to an embodiment of this application.

An embodiment of this application further provides a system. As shown in FIG. 10, the system 1000 includes:

the terminal device 600 in the embodiment of this application and the network device 800 in the embodiment of this application.

An embodiment of this application further provides a computer storage medium, where the computer storage medium may store a program instruction used to indicate any one of the foregoing methods.

Optionally, the storage medium may be specifically the memory 730 or 930.

An embodiment of this application further provides a network device, the network device may correspond to the network device in the data sending method 400 in the embodiment shown in FIG. 4, and the foregoing and other management operations and/or functions of the modules in the network device are separately intended for implementing corresponding steps in the method 400. For brevity, details are not described herein again.

An embodiment of this application further provides a terminal device, the terminal device corresponds to the terminal device in the data sending method 500 in the embodiment shown in FIG. 5, and the foregoing and other management operations and/or functions of the modules in the terminal device are separately intended for implementing corresponding steps in the method 500. For brevity, details are not described herein again.

An embodiment of this application further provides a network device, the network device may correspond to the network device in the data sending method 500 in the embodiment shown in FIG. 5, and the foregoing and other management operations and/or functions of the modules in the network device are separately intended for implementing corresponding steps in the method 500. For brevity, details are not described herein again.

It should be understood that the processor 720 or the processor 920 may be an integrated circuit chip, and has a signal processing capability. In embodiments, steps in the foregoing method embodiments can be implemented by using an integrated logical circuit of hardware in the processor or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory 730 or the memory 930 in the embodiments of the present invention may be a volatile memory or a non-volatile memory, or may include both of a volatile memory and a non-volatile memory. The non-volatile memory may be a read-only memory (ROM), a programmable read-only memory (Programmable ROM or PROM), an erasable programmable read-only memory (Erasable PROM or EPROM), an electrically erasable programmable read-only memory (Electrically EPROM or EEPROM), or a flash memory. The volatile memory may be a random access memory (RAM) that is used as an external cache. Through example but not limitative description, many forms of RAMs may be used, such as a static random access memory (Static RAM or SRAM), a dynamic random access memory (Dynamic RAM or DRAM), a synchronous dynamic random access memory (Synchronous DRAM or SDRAM), a double data rate synchronous dynamic random access memory (Double Data Rate SDRAM or DDR SDRAM), an enhanced synchronous dynamic random access memory (Enhanced SDRAM or ESDRAM), a synchronous link dynamic random access memory (Synchlink DRAM or SLDRAM), and a direct rambus dynamic random access memory (Direct Rambus RAM or DR RAM). It should be noted that the memory of the systems and methods described in this specification include but are not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in each embodiment of this application may be integrated into one processing unit, or each of units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data sending method, comprising:
    receiving, by a terminal device, first scheduling information, wherein the first scheduling information indicates first resources that are resources used to send first transport blocks, the first scheduling information further indicates a probability value, and the probability value is a block error rate for the first transport blocks that are received by a network device on the first resources or a probability that the network device successfully receives the first transport blocks on the first resources; and
    sending, by the terminal device, the first transport blocks on the first resources based on the first scheduling information.

2. The method according to claim 1, wherein the probability value is a first probability value or a second probability value; and wherein
    the first probability value indicates that all or some of the first transport blocks are retransmitted, and the second probability value indicates that all or some of the first transport blocks are not retransmitted, or
    the first probability value indicates that all or some of the first transport blocks may be retransmitted, and the second probability value indicates that some or all of the first transport blocks may not be retransmitted.

3. The method according to claim 2, wherein the first scheduling information comprises first indication information, the first indication information indicates one of at least two modulation and coding scheme (MCS) tables, a first table of the at least two MCS tables indicates the first probability value, and a second table of the at least two MCS tables indicates the second probability value.

4. The method according to claim 2, wherein the first scheduling information comprises second indication information, the second indication information is at least one bit, a first bit status value of the at least one bit indicates the first probability value, and a second bit status value of the at least one bit indicates the second probability value.

5. The method according to claim 2, wherein the first scheduling information comprises third indication information, the third indication information indicates one of at least two time intervals, a first time interval of the at least two time intervals indicates the first probability value, and a second time interval of the at least two time intervals indicates the second probability value.

6. The method according to claim 5, wherein the method further comprises:
    receiving higher layer signaling, wherein the higher layer signaling comprises a first threshold; and
    determining the first time interval and/or the second time interval based on the first threshold.

7. The method according to claim 2, wherein the method further comprises:
performing a preparation operation for retransmitting all or some of the first transport blocks, wherein the terminal device determines that the probability value is the first probability value.

8. The method according to claim 1, wherein the first scheduling information further indicates at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a transmit power control command used to retransmit some or all of the first transport blocks.

9. The method according to claim 1, wherein the method further comprises:
receiving second scheduling information, wherein the second scheduling information instructs the terminal device to retransmit some or all of the first transport blocks on second resources; and
retransmitting some or all of the first transport blocks on the second resources based on the second scheduling information.

10. The method according to claim 9, wherein the method further comprises:
receiving third scheduling information, wherein the third scheduling information instructs the terminal device to retransmit some or all of the first transport blocks;
determining third resources based on the third scheduling information and/or the first scheduling information; and
retransmitting some or all of the first transport blocks on the third resources.

11. A data sending method, comprising:
sending, by a terminal device, first scheduling information, wherein the first scheduling information indicates first resources that are resources used to send first transport blocks, the first scheduling information further indicates a probability value, and the probability value is a block error rate for the first transport blocks that are received by a network device on the first resources or a probability that the network device successfully receives the first transport blocks on the first resources; and
receiving, by the terminal device, the first transport blocks on the first resources.

12. The method according to claim 11, wherein the probability value is a first probability value or a second probability value; and wherein
the first probability value indicates that all or some of the first transport blocks are retransmitted, and the second probability value indicates that all or some of the first transport blocks are not retransmitted, or
the first probability value indicates that all or some of the first transport blocks may be retransmitted, and the second probability value indicates that some or all of the first transport blocks may not be retransmitted.

13. The method according to claim 12, wherein the first scheduling information comprises first indication information, the first indication information indicates one of at least two modulation and coding scheme (MCS) tables, a first table of the at least two MCS tables indicates the first probability value, and a second table of the at least two MCS tables indicates the second probability value.

14. The method according to claim 12, wherein the first scheduling information comprises second indication information, the second indication information is at least one bit, a first bit status value of the at least one bit indicates the first probability value, and a second bit status value of the at least one bit indicates the second probability value.

15. The method according to claim 12, wherein the first scheduling information comprises third indication information, the third indication information indicates one of at least two time intervals, a first time interval of the at least two time intervals indicates the first probability value, and a second time interval of the at least two time intervals indicates the second probability value.

16. The method according to claim 15, wherein the method further comprises:
sending higher layer signaling, wherein the higher layer signaling comprises a first threshold, and the first threshold is used by a terminal device to determine the first time interval and/or the second time interval.

17. The method according to claim 11, wherein the first scheduling information is further used to indicate at least one of a modulation scheme used to retransmit some or all of the first transport blocks, a time-frequency domain resource used to retransmit some or all of the first transport blocks, a coding scheme used to retransmit some or all of the first transport blocks, reference signal information used to retransmit some or all of the first transport blocks, a redundancy version used to retransmit some or all of the first transport blocks, a code rate used to retransmit some or all of the first transport blocks, an antenna port used to retransmit some or all of the first transport blocks, precoding matrix indication information used to retransmit some or all of the first transport blocks, carrier indication information used to retransmit some or all of the first transport blocks, a time interval used to retransmit some or all of the first transport blocks, start information used to retransmit some or all of the first transport blocks, and a transmit power control command used to retransmit some or all of the first transport blocks.

18. The method according to claim 11, wherein the method further comprises:
sending second scheduling information, wherein the second scheduling information instructs the terminal device to retransmit some or all of the first transport blocks on second resources; and
receiving some or all of the first transport blocks on the second resources.

19. The method according to claim 17, wherein the method further comprises:
sending third scheduling information, wherein the third scheduling information instructs the terminal device to retransmit some or all of the first transport blocks; and
receiving some or all of the first transport blocks on third resources.

20. A data sending apparatus, comprising:
a memory configured to store one or more instructions;
a processor coupled with the memory to execute the one or more instructions; and a transceiver coupled with the processor configured to:
- receive first scheduling information, wherein the first scheduling information indicates first resources that are resources used to send first transport blocks, the first scheduling information further indicates a probability value, and the probability value is a block error rate for the first transport blocks that are received by a network device on the first resources or a probability that a network device successfully receives the first transport blocks on the first resources, and
- send the first transport blocks on the first resources based on the first scheduling information.

* * * * *